United States Patent
Ong et al.

(10) Patent No.: US 11,204,594 B2
(45) Date of Patent: Dec. 21, 2021

(54) SYSTEMS, METHODS, AND APPARATUS TO AUGMENT PROCESS CONTROL WITH VIRTUAL ASSISTANT

(71) Applicant: Fisher-Rosemount Systems, Inc., Round Rock, TX (US)

(72) Inventors: Tiong P. Ong, Austin, TX (US); Mark J. Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 152 days.

(21) Appl. No.: 16/219,583

(22) Filed: Dec. 13, 2018

(65) Prior Publication Data
US 2020/0192319 A1    Jun. 18, 2020

(51) Int. Cl.
*G05B 19/05* (2006.01)
*G10L 15/18* (2013.01)
*G10L 17/22* (2013.01)

(52) U.S. Cl.
CPC ......... *G05B 19/054* (2013.01); *G05B 19/056* (2013.01); *G10L 15/1822* (2013.01); *G10L 17/22* (2013.01)

(58) Field of Classification Search
CPC .. G05B 19/054; G05B 19/056; G05B 19/042; G05B 2219/31121; G05B 2219/32014; G05B 19/409; G05B 19/4184; G05B 19/4185; G05B 2219/33273; G05B 19/418; G10L 15/1822; G10L 17/22
See application file for complete search history.

(56) References Cited

U.S. PATENT DOCUMENTS

| | | | | |
|---|---|---|---|---|
| 9,805,718 | B2 * | 10/2017 | Ayan | H04M 3/4936 |
| 10,714,095 | B2 * | 7/2020 | Orr | H04L 12/282 |
| 2014/0316764 | A1 * | 10/2014 | Ayan | G10L 15/22 |
| | | | | 704/9 |

(Continued)

FOREIGN PATENT DOCUMENTS

GB    2513457 A    10/2014

OTHER PUBLICATIONS

UK Intellectual Property Office, "Search Report under Section 17(5)," issued in connection with application No. GB1917848.2, dated Aug. 28, 2020, 3 pages.

(Continued)

*Primary Examiner* — Thomas C Lee
*Assistant Examiner* — Charles Cai
(74) *Attorney, Agent, or Firm* — Hanley, Flight & Zimmerman, LLC

(57) ABSTRACT

Methods, apparatus, systems, and articles of manufacture are disclosed to augment process control with a virtual assistant. An example apparatus includes at least one processor and memory storing instructions that, when executed, cause the at least one processor to determine a process control context based on a request for information associated with a field device of a process control system, the process control context based on a configuration of the process control system, identify a topic included in the request, the topic corresponding to the field device based on the process control context, map the topic to an action to be executed by the field device, generate a command to direct the field device to execute the action based on the mapping, and transmit the command to the field device to execute the action.

25 Claims, 8 Drawing Sheets

(56) References Cited

U.S. PATENT DOCUMENTS

| | | | |
|---|---|---|---|
| 2015/0340033 A1 | 11/2015 | Di Fabbrizio et al. | |
| 2015/0348554 A1* | 12/2015 | Orr | G05B 15/02 |
| | | | 704/275 |
| 2016/0055674 A1* | 2/2016 | Mullins | G02B 27/017 |
| | | | 345/633 |
| 2017/0249745 A1* | 8/2017 | Fiala | G06T 7/277 |
| 2019/0052638 A1* | 2/2019 | Agarwal | G06T 19/006 |
| 2019/0138558 A1* | 5/2019 | Scavo | G10L 15/08 |

OTHER PUBLICATIONS

Benedikt Schmidt et al., 2018. "Industrial Virtual Assistants: Challenges and Opportunities". In Proceedings of the 2018 ACM International Joint Conference and 2018 International Symposium on Pervasive and Ubiquitous Computing and Wearable Computers (UbiComp '18). Association for Computing Machinery, New York, NY, USA, 794-801. DOI: https://doi.org/10.1145/3267305.3274131 (8 pages).

* cited by examiner

| LEVEL | CATEGORY | PARAMETER | TAG | DESCRIPTION |
|---|---|---|---|---|
| L1 | COMMON | VESSEL LEVEL | L XX27 | MOST IMPORTANT PARAMETER FOR KNOCKOUT POTS |
| | | VESSEL PRESSURE | P XX27 | COULD ALSO BE DIFFERENTIAL PRESSURE |
| | SURGE DRUM | FLOW IN/FLOW OUT | F XX27 | |
| | | TEMPERATURE | T XX27 | IF REQUESTED |
| L2 | COMMON | VESSEL TEMPERATURE | T XX27 | |

FIG. 3

SYSTEMS, METHODS, AND APPARATUS TO AUGMENT PROCESS CONTROL WITH VIRTUAL ASSISTANT

FIELD OF THE DISCLOSURE

This disclosure relates generally to process control systems and, more particularly, to systems, methods, and apparatus to augment process control with virtual assistant.

BACKGROUND

In recent years, process control systems, like those used in chemical, petroleum, and/or other processes, have grown progressively more complex with the proliferation of field devices having increased processing power to perform new and/or improved process control functions. Current generation process control systems include a greater number and variety of field devices or field instruments for measuring and/or controlling different aspects of a process control environment. Increased automation in the process control environment provides operators with additional interaction opportunities through different mediums to facilitate operations of the process control systems.

SUMMARY

An example apparatus disclosed herein to augment process control using a virtual assistant includes a memory storing instructions and at least one processor to execute the instructions to cause the at least one processor to determine a process control context based on a request for information associated with a field device of a process control system, the process control context based on a configuration of the process control system, identify a topic included in the request, the topic corresponding to the field device based on the process control context, map the topic to an action to be executed by the field device, generate a command to direct the field device to execute the action based on the mapping, and transmit the command to the field device to execute the action.

An example method disclosed herein to augment process control using a virtual assistant includes determining a process control context based on a request for information associated with a field device of a process control system, the process control context based on a configuration of the process control system, identifying a topic included in the request, the topic corresponding to the field device based on the process control context, mapping the topic to an action to be executed by the field device, generating a command to direct the field device to execute the action based on the mapping, and transmitting the command to the field device to execute the action.

An example non-transitory computer readable storage medium includes instructions, which when executed, cause a machine to at least determine a process control context based on a request for information associated with a field device of a process control system, the process control context based on a configuration of the process control system, identify a topic included in the request, the topic corresponding to the field device based on the process control context, map the topic to an action to be executed by the field device, generate a command to direct the field device to execute the action based on the mapping, and transmit the command to the field device to execute the action.

BRIEF DESCRIPTION OF THE DRAWINGS

FIG. 3 depicts an example table of an example profile corresponding to an example process tank of the example process control system of FIG. 1A.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1A:
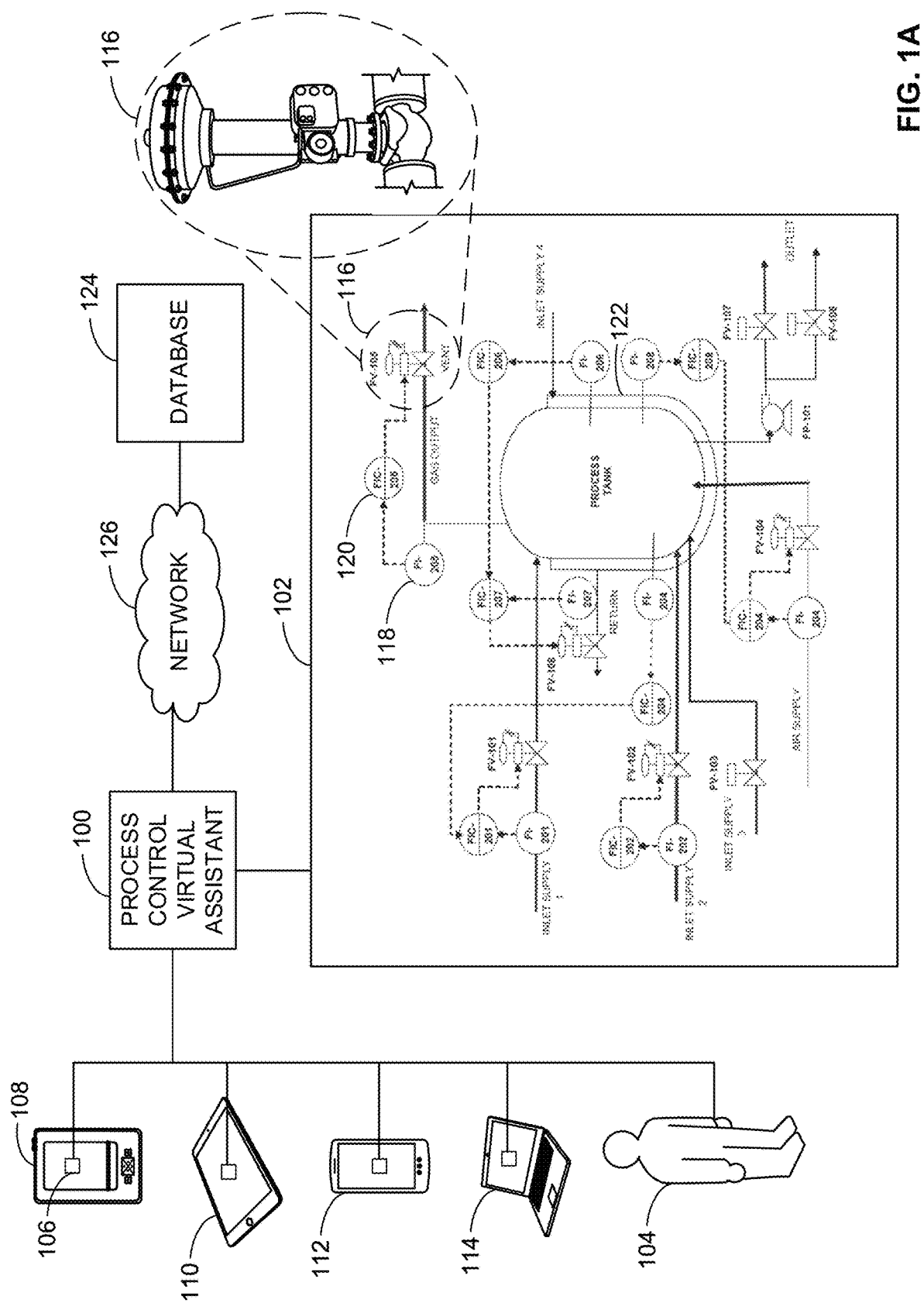
FIG. 1A is a schematic illustration of an example virtual assistant facilitating an operation of an example process control system.

Process control systems such as distributed control systems are growing increasingly complex as individual components with increased data acquisition resolution, processing power, and signal conditioning are developed. A distributed control system (DCS) is used to monitor and/or control different aspects of an operation to be conducted in a process control environment such as, for example, manufacturing components, processing raw chemical materials, etc. A DCS typically includes multiple controllers (e.g., electronic controllers, programmable controllers, etc.) with accompanying input/output (I/O) modules, which allow the controllers to acquire signals from various input field devices and/or instruments and control various output field devices and/or instruments. An I/O module may include inputs, outputs, and/or a combination thereof.

As used herein, the terms "field device," "field instrument," or "instrument" refer to control devices such as, for example, actuators, actuator assemblies, actuator controllers, actuator positioners, sensors, transmitters, valve assemblies, etc., that may be used throughout a process control system to measure and/or control different aspects (e.g., other process control devices, etc.) of the process control system.

A typical DCS includes controllers, programmable processors, and/or logic circuits distributed throughout a process control environment to increase reliability and reduce installation costs by localizing control functions near the process control environment, but enable monitoring and supervisory control of the process control environment remotely. In some instances, operators including engineers, maintenance technicians, or other field personnel monitor the DCS either remotely through a process control network or locally by physically interacting with controllers, field devices, etc. For example, an operator can connect to a field device either through a wired connection or a wireless connection to view process control data associated with the field device and/or components or devices communicatively coupled to the field device.

In some known DCS implementations, operators have limited visibility of field devices and/or components or devices communicatively coupled to the field devices when locally interacting with the field devices. For example, an operator may only have access to limited data associated with a valve when connected to a valve controller associated with the valve via a computer-based software application. In such examples, the operator may only view limited data such as an actuator pressure or a valve position. For example, the operator may only be able to view the limited data when in a process control room via a human machine interface that is displaying the limited data. In other examples, the operator may only be able to view the limited data via a device (e.g., a laptop computer, a smartphone, a tablet, etc.) communicatively coupled to the valve, which can require additional technical knowledge (e.g., setting up a communication connection, troubleshooting a non-responsive communication connection, etc.) to communicate with the valve via the device. In such examples, the first operator may require the assistance of a second operator to view the limited data while the first operator is performing a maintenance or troubleshooting task on the valve. For example, the first operator may not have a free hand to operate the device while attempting to perform one or more tasks associated with the valve.

In some known DCS implementations, the operator is unable to view associated data and/or supplementary data associated with the valve, components or devices coupled to the valve, and/or components associated with a control loop including the valve. Supplementary data can include alarm data, action or task data (e.g., one or more actions or routines being performed or is capable of being performed by the field device), historical data, etc. Further, the operator is unable to obtain supplementary information including process control diagrams, maintenance instructions, wiring schematics, etc., from the field device when performing maintenance on and/or otherwise interacting with the field device. In such examples, the operator may have to leave the process control area to obtain the supplementary information prior to returning to the process control area to complete a task based on the supplementary information which, in turn, generates operational inefficiencies.

Examples disclosed herein include systems, methods, and apparatus that enable a user and/or a computer-based software application (e.g., a user interfacing with the computer-based software application) to initiate conversations with virtual assistants, or bots (e.g., a process control bot), to assist operators or users with tasks associated with process control. Examples disclosed herein facilitate a request from the user for information associated with a field device or a process unit by returning corresponding process control values and engaging with the user in a supportive or supplementary role.

In some disclosed examples, a user interacts with the virtual assistant when installed on example computing devices, such as a laptop computer, a smartphone, a tablet, etc. In some disclosed examples, a user interacts with the virtual assistant when installed on other example computing devices including wearable devices, such as a headset, a wristband, or glasses that include one or more processors, one or more logic circuits, etc., to implement the virtual assistant. In such disclosed examples, the virtual assistant can interact with field devices that are within a range of a wireless beacon, such as a Bluetooth beacon, a Wi-Fi beacon, etc. For example, a Wi-Fi beacon may be communicatively coupled to one or more servers that facilitate requests from the virtual assistant. In such examples, the virtual assistant, when within range of the Wi-Fi beacon, can request information associated with field devices that are within the range of the Wi-Fi beacon by querying the one or more servers via the Wi-Fi beacon. In some examples, in response to entering a coverage area of the Wi-Fi beacon, the virtual assistant downloads information associated with the field devices to improve a speed at which user requests associated with the field devices are processed and communicated to the user.

In some disclosed examples, the virtual assistant obtains a request from a user, parses the request for actionable information, and supports a set of actions or levels of information based on the actionable information. In some disclosed examples, the actions include providing parameter values associated with the field device or a component or device communicatively coupled to the field device. In other disclosed examples, the actions include providing supplementary information such as a current process or task being implemented and/or otherwise executed by the field device, step-by-step instructions regarding performing a task (e.g., a maintenance task, a task associated with a test plan, etc.) on or with the field device, a status of a process control task associated with the field device, etc. In some examples, the actions include a process control workflow including one or more process control operations that the user can start, stop, or pause with a corresponding command (e.g., a command via a computer-based application, a voice-based command, etc.).

FIG. 1A is a schematic illustration of an example virtual assistant (VA) 100 facilitating an operation of an example process control system 102. In FIG. 1A, the VA 100 is a process control virtual assistant. For example, the VA 100 can be a computer-based or software agent that performs tasks or services for an example user (e.g., an operator, a maintenance technician, a process control operative, etc.) 104. In some examples, the VA 100 interacts with multiple users 104. In some examples, the VA 100 is a bot, a chatbot, etc., that can be accessed, initialized, and/or otherwise interacted with via a computer-based or software application, a voice command, a text-based command, etc.

In the illustrated example of FIG. 1A, the VA 100 retrieves and/or otherwise obtains requests from an example host application 106 operating and/or otherwise executing on devices (e.g., processor-based devices) including a first example device 108, a second example device 110, a third example device 112, and a fourth example device 114. In FIG. 1A, the host application 106 includes one or more routines (e.g., software routines) or programs (e.g., software programs) executed by machine readable instructions. For example, the host application 106 can be a process control related software application operating on a standard operating system (e.g., a Windows™-based operating system, an Apple macOS® operating system, an Apple iOS® operating system, an Android™ operating system, a Linux® operating system, etc.). The host application 106 is executed by the devices 108, 110, 112, 114 to enable the user 104 to obtain data or information associated with one or more field devices or corresponding operations included in the process control system 102 via the VA 100.

In some examples, the host application 106, via the VA 100, enables the user 104 to perform a desired function or task with respect to the process being controlled and/or otherwise monitored by the process control system 102, such as viewing the current state of the process (e.g., via a graphical user interface), evaluating the process, modifying an operation of the process (e.g., via a visual object diagram), etc. In some examples, the host application 106 performs the desired function by interacting with field devices included in the process control system 102 via the VA 100 based on retrieving one or more available commands from the VA 100, selecting one of the retrieved commands, and transmitting the command to the field device via the VA 100. For example, the user 104 can ask the VA 100 to perform a task, the VA 100 can process the request, the VA 100 can generate an audible message describing and/or otherwise including the one or more available commands based on the processed request, the user 104 can select one of the commands via a verbal confirmation or command, and the VA 100 can transmit the command to one or more corresponding field devices.

In the illustrated example of FIG. 1A, the first device 108 is a process control handheld device such as an Emerson™ AMS TREX™ capable of facilitating an interaction with the process control system 102 via the host application 106 (e.g., via an integrated display, microphone, and/or speakers). Alternatively, the first device 108 may be any other type of process control handheld or mobile device. In FIG. 1A, the second device 110 is an Internet-enabled tablet (e.g., an iPad™, a Surface, etc.) capable of facilitating an interaction with the process control system 102 via the host application 106 (e.g., via an integrated display, microphone, and/or speakers). In FIG. 1A, the third device 112 is an Internet-enabled mobile handset (e.g., a smartphone) and, thus, can facilitate an interaction with the process control system 102 via the host application 106 (e.g., via an integrated display, microphone, and/or speakers). In FIG. 1A, the fourth device 114 is an Internet-enabled laptop computer capable of facilitating an interaction with the process control system 102 via the host application 106 (e.g., via an integrated display, microphone, and/or speakers). Alternatively, the VA 100 may facilitate an interaction with fewer or more than the quantity and/or type of devices depicted in FIG. 1A. Although the host application 106 is depicted as being the same on each of the devices 108, 110, 112, 114, alternatively, the host application 106 may be tailored and/or otherwise customized based on the platform. For example, the host application 106 executing on the first device 108 may be different than the host application 106 executing on the second device 110. In such examples, the host application 106 may have a different user interface, different communication drivers (e.g., the first device 108 may have Bluetooth 5.0 while the second device 110 has Bluetooth 4.0, etc.), to comport with the corresponding platform. In some examples, the host application 106 has no interface other than a voice user interface (VUI). For example, the VUI of the host application 106 can be used to completely replace a keyboard, a gesture from the user 104, etc.

In the illustrated example of FIG. 1A, the user 104 and/or the host application 106 can interact with the VA 100 via commands including auditory, audible, computer-based, gesture, or verbal commands. Alternatively, any other type of command can be used. In some examples, the user 104 can issue a verbal request and/or otherwise ask the VA 100 for data associated with field devices included in the process control system 102 including a first example field device (field valve (FV) FV-105) 116 and a second example field device (field instrument (FI) FI-205) 118. The first field device 116 of FIG. 1A is a fluid flow control assembly. For example, the first field device 116 can be an electrically, hydraulically, and/or pneumatically actuated valve assembly. For example, the first field device 116 can include at least an actuator, a valve (e.g., a butterfly valve, a globe valve, etc.), a valve controller (e.g., a local single-loop process controller), etc. For example, the user 104 can issue a verbal command to the VA 100 to request and/or otherwise retrieve data associated with the first field device 116 including an actuator pressure, a valve position, etc. Additionally or alternatively, the VA 100 can trigger a conversation corresponding to and/or otherwise facilitate an interaction with any other type of field device than those depicted and/or described in connection with FIG. 1A. Additionally or alternatively, the VA 100 can request and/or otherwise retrieve any other data associated with the first field device 116 (e.g., a wiring diagram including the first field device 116, a software or communication protocol identifier of the first field device 116, a firmware version associated with a controller included in the first field device 116, etc.).

The second field device 118 of the illustrated example of FIG. 1A is a sensor. For example, the second field device 118 can be a pressure transmitter, a temperature transmitter, etc. In other examples, the second field device 118 can be a level transmitter, a pH transmitter, a valve positioner, etc. For example, the user 104 can issue a verbal command (e.g., "Virtual Assistant, tell me about FI-205.") to the VA 100 to request data associated with the second field device 118 including a sensor measurement (e.g., a pressure measurement, a flow measurement, a temperature measurement, etc.) in engineering units (e.g., pounds per square inch (PSI), degrees Centigrade, etc.), in non-engineering units (e.g., a voltage measurement, a current measurement, etc.), in crude units, in fluid catalytic cracking (FCC) units, etc., and/or a combination thereof. In other examples, the verbal command can be a request for calibration information (e.g., a date of last calibration, a date of next calibration, a user that calibrated the sensor, etc.), a configuration (e.g., a communication protocol output address, an electrical output range, etc.), manufacturer information (e.g., a model number, a serial number, etc.), version information (e.g., a firmware version associated with the second field device 118), etc.

In some examples, the user 104 and/or the host application 106 queries the VA 100 for information associated with an example control loop 120. In FIG. 1A, the control loop 120 is a field instrument control (FIC) loop designated by FIC-205. The control loop 120 of FIG. 1A includes the first field device 116 and the second field device 118. The control loop 120 of FIG. 1A corresponds to a controller (e.g., a PLC, a processor-based controller, etc.) obtaining an input from the second field device 118 and/or generating an output signal to the first field device 116. Alternatively, the control loop 120 may include fewer or more field devices. In FIG. 1A, the control loop 120 can operate the first field device 116 (e.g., open the valve, close the valve, move the valve to a specific position, etc.). In FIG. 1A, the control loop 120 can retrieve and/or otherwise obtain sensor data from the second field device 118 that is associated with the first field device 116. For example, the control loop 120 can command the first field device 116 to open and cause a fluid to flow through the first field device 116 and can measure a parameter of the flow (e.g., a temperature, a flow rate, a pressure, etc.) based on data obtained from the second field device 118.

In some examples, the VA 100 returns information associated with the control loop 120 including a MODE parameter (e.g., automatic mode, manual mode, cascade mode, etc.), a set point (SP) parameter, a process variable (PV) parameter or a measured value (MV) parameter, an output (OUT) parameter, a status parameter, and/or one or more alarms associated with components or field devices included in the control loop 120. For example, the SP parameter can correspond to an anticipated value, a desired value, etc., for the MV or the PV. In such examples, the SP can be entered and/or otherwise communicated by the user 104 via the VA 100. For example, the user 104 can instruct the VA 100 to assign a value of 100% open to an SP parameter for a valve position parameter of the first field device 116. The MV or the PV parameter can correspond to a measured value of the process output (e.g., a flow rate, a pressure, a temperature, etc., of the fluid flowing through the first field device 116). The OUT parameter can correspond to an output of the control loop 120 (e.g., an output from a controller). The OUT parameter can correspond to an output signal generated and transmitted by the control loop 120 to an actuator (e.g., an actuator included in the first field device 116) to make an adjustment of the actuator.

In some examples, in response to the MODE parameter corresponding to automatic mode, the control loop 120 receives the SP and the PV, calculates the OUT parameter, and transmits an output signal corresponding to the OUT parameter to the first field device 116. In some examples, in response to the MODE parameter corresponding to manual mode, the control loop 120 is overridden, allowing the user 104 to send the output signal corresponding to the OUT parameter directly to the actuator. For example, the user 104 can instruct the VA 100 to adjust the valve position of the first field device 116 by overriding the SP stored in the control loop 120.

In some examples, in response to the MODE parameter corresponding to cascade mode, a control loop receives a SP from an external source such as, but not limited to, another controller associated with another control loop (e.g., FIC-201, FIC-204, etc.). For example, control loop FIC-201 can receive a first SP associated with field device FV-101 from control loop FIC-204. In such examples, the user 104 can instruct the VA 100 to generate a flow rate of 2 barrels/minutes (bpm) of a fluid flowing through FV-101. The VA 100 can process the request from the user 104, generate a command, and transmit the command to FIC-204 to assign a flow rate of 2 bpm to a flow rate SP. FIC-204 can obtain a level measurement of an example process tank 122 from FI-204 and convert the change in level to a flow rate (e.g., a flow rate based on a fill rate of the process tank 122). In turn, FIC-204 can generate and transmit a command to FIC-201 corresponding to a valve position SP of FV-101 based on the flow rate SP. In response to FIC-201 receiving the command, FIC-201 opens FV-101 to achieve and/or otherwise satisfy the valve position SP that can satisfy the flow rate SP of 2 bpm through FV-101. In response to satisfying the valve position SP, FIC-204 can determine whether the flow rate SP of 2 bpm through FV-101 has been satisfied. In some examples, the VA 100 generates an audible message to the user 104 indicating the flow rate through the FV-101 associated with the request from the user has been satisfied. Additionally or alternatively, the VA 100 can include information in the audible message such as a fill rate of the process tank 122, a value of the valve position SP, a valve position associated with FV-101, etc., and/or a combination thereof.

In some examples, the user 104 and/or the host application 106 issue a command to the VA 100 to be executed by one or more components of the process control system 102. For example, the user 104 can issue a verbal command to the VA 100 to open or close the first field device 116, to direct the second field device 118 to use a different unit of measure or output data using a different communication protocol, etc. In other examples, the host application 106 can generate a command and transmit the command to the VA 100 to execute a workflow including one or more operations of one or more components of the process control system 102. For example, the host application 106 can generate and transmit a command to the VA 100 to fill the process tank 122. In such examples, the VA 100 can operate one or more field devices such as FV-101, FV-102, etc., to fill the process tank 122, vent a gas output by opening the first field device 116, provide feedback to the user 104 and/or the host application 106 including a status of the operation, etc. For example, the status can be an audible and/or visual-based message indicating that the process tank 122 is 40% full. In other examples, the message can include an estimated time duration of the operation remaining, an elapsed amount of time since the beginning of the operation, etc. In some examples, the VA 100 generates a notification to the user 104, the host application 106, etc., including safety information. For example, the notification can correspond to a gas leak in FCC, a liquid leak in the process tank 122, etc. Additionally or alternatively, although the process tank 122 is depicted in FIG. 1A, the VA 100 can trigger conversations with the user 104 and/or the host application 106 corresponding to a facilitation of a function and/or an operation with one or more heat exchangers, one or more distillation columns, one or more fired heaters, etc., and/or a combination thereof.

In the illustrated example of FIG. 1A, the VA 100 queries and/or retrieves information from an example database 124 via an example network 126. In some examples, the database 124 includes a configuration of the process control system 102 that can include one or more profiles, where each of the profiles corresponds to a component included in the process control system 102 (e.g., a first profile corresponding to the first field device 116, a second profile corresponding to the process tank 122, etc.). In some examples, the profiles can correspond to two or more components. For example, a profile can include information associated with the control loop 120, which can include information corresponding to the first field device 116, the second field device 118, a controller included in the control loop 120, etc. In some examples, the database 124 includes actions (e.g., basic actions, complex actions, etc.) that can be executed by the components of the process control system 102. In some examples, the database 124 includes scripts that can be executed by the VA 100 to instruct one or more of the components of the process control system 102 to execute one or more actions.

The database 124 of FIG. 1A can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 124 may additionally or alternatively be implemented by one or more double data rate (DDR) memories, such as DDR, DDR2, DDR3, DDR4, mobile DDR (mDDR), etc. The database 124 may additionally or alternatively be implemented by one or more mass storage devices such as hard disk drive(s), compact disk drive(s), digital versatile disk drive(s), solid-state disk drive(s), etc. While in the illustrated example the database 124 is illustrated as a single database, the database 124 may be implemented by any number and/or type(s) of databases. Furthermore, the data stored in the database 124 may be in any data format such as, for example, binary data, comma delimited data, tab delimited data, structured query language (SQL) structures, etc.

The network 126 of FIG. 1A is a bus and/or a computer network. For example, the network 126 can be a process control network. In some examples, the network 126 is a network with the capability of being communicatively coupled to the Internet. However, the network 126 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The network 126 may enable the example VA 100 to be in communication with the database 124.

Figure 1B:
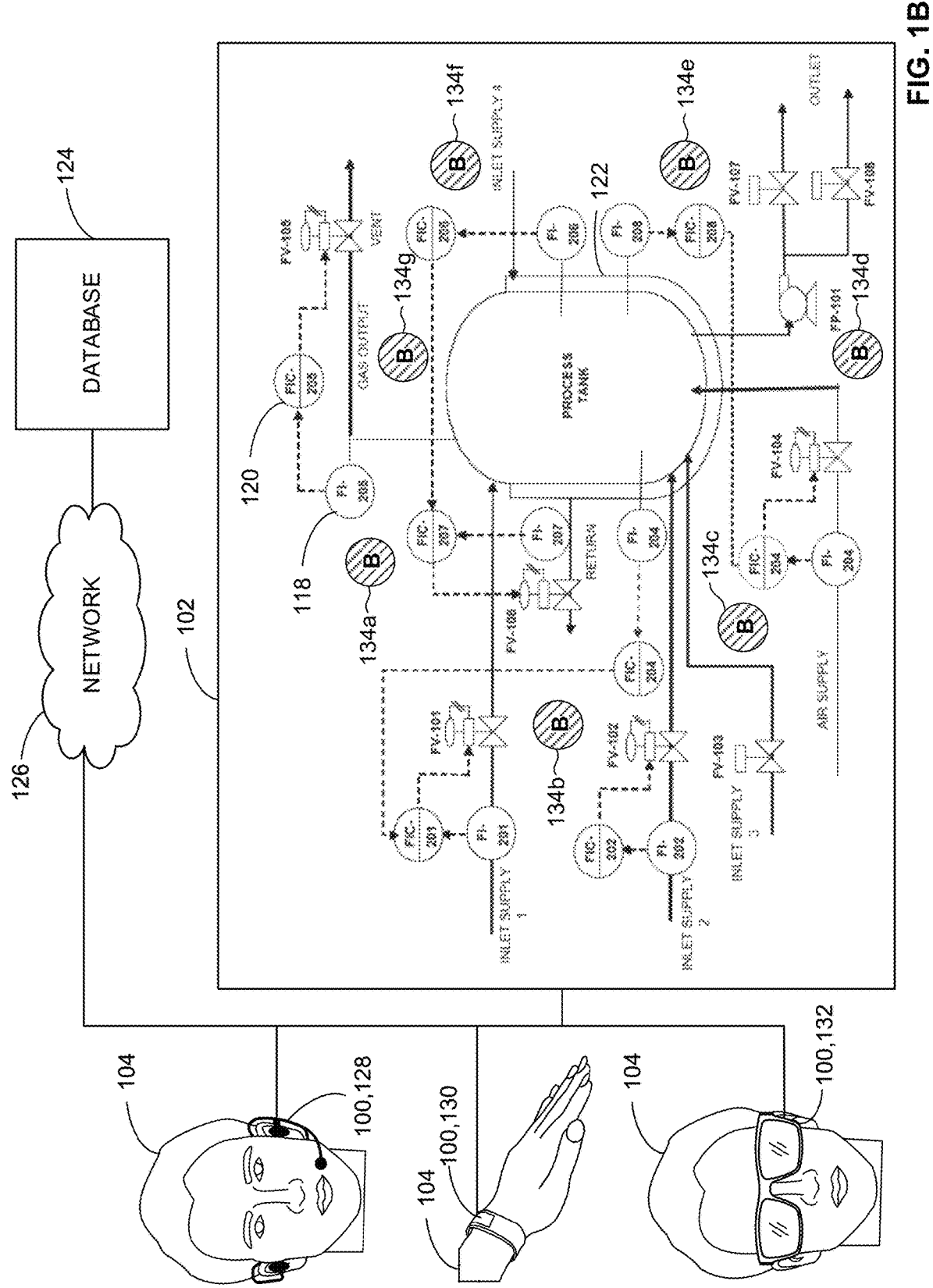
FIG. 1B is a schematic illustration of the example virtual assistant of FIG. 1A included in example wearable devices facilitating the operation of the example process control system of FIG. 1A.

FIG. 1B is a schematic illustration of the example VA 100 of FIG. 1A included in and/or otherwise executing on example wearable devices 128, 130, 132 to facilitate the operation of the example process control system 102 of FIG. 1A. In FIG. 1B, the wearable devices 128, 130, 132 include a first example wearable device 128, a second example wearable device 130, and a third example wearable device 132. The first wearable device 128 of FIG. 1B is a headset. Additionally or alternatively, the VA 100 may be installed and/or otherwise configured on any other computing or wearable device, such as a smart watch, smart goggles, etc.

The first wearable device 128 of the illustrated example of FIG. 1B may be a headset that includes a processor-based computer platform including one or more processors, one or more memory devices and/or one or more mass storage devices to store machine readable instructions, one or more interface circuits to facilitate Bluetooth and/or Wi-Fi communication, one or more input devices such as a button and/or a microphone, one or more output devices such as a speaker, etc., and/or any other hardware component that can implement the VA 100. In such examples, the user 104 can invoke the VA 100 on the first wearable device 128 by pushing a button or by annunciating a particular phrase such as "Hello Virtual Assistant."

The second wearable device 130 of the illustrated example of FIG. 1B is a wrist band. For example, the second wearable device 130 may be a wrist band that includes a processor-based computer platform including one or more processors, one or more memory devices and/or one or more mass storage devices to store machine readable instructions, one or more interface circuits to facilitate Bluetooth and/or Wi-Fi communication, one or more input devices such as a button and/or a microphone, one or more output devices such as a speaker, etc., and/or any other hardware component that can implement the VA 100. In such examples, the user 104 can invoke the VA 100 on the second wearable device 130 by pushing a button or by annunciating a particular phrase such as "Hello Virtual Assistant."

The third wearable device 132 of the illustrated example of FIG. 1B corresponds to glasses including two lenses. For example, the third wearable device 132 may be glasses that include a processor-based computer platform including one or more processors, one or more memory devices and/or one or more mass storage devices to store machine readable instructions, one or more interface circuits to facilitate Bluetooth and/or Wi-Fi communication, one or more input devices such as a button and/or a microphone, one or more output devices such as a display, a speaker, etc., and/or any other hardware component that can implement the VA 100. In such examples, the user 104 can invoke the VA 100 on the third wearable device 132 by pushing a button, annunciating a particular phrase such as "Hello Virtual Assistant," making a gesture motion such as blinking or waiving a hand in front of the glasses, etc. In some examples, the third wearable device 132 includes two displays including a first display that is integrated into a first one of the lenses and a second display that is integrated into a second one of the lenses. In other examples, the third wearable device 132 includes one display either in the first or the second lens of the glasses.

In the illustrated example of FIG. 1B, the wearable devices 128, 130, 132 are communicatively coupled to the network 126 via a wireless connection such as Bluetooth or Wi-Fi. In some examples, one or more of the wearable devices 128, 130, 132 can be communicatively coupled to the network 126 via a direct wireless connection without an interleaving device such as an access point, a beacon, a gateway, etc. In other examples, one or more of the wearable devices 128, 130, 132 can be communicatively coupled to the network 126 via an interleaving device such as an access point, a beacon, a gateway, etc.

In the illustrated example of FIG. 1B, one or more of the wearable devices 128, 130, 132 can be communicatively coupled to the network 126 via one or more of example beacons 134*a-g*. In FIG. 1B, the beacons 134*a-g* are Wi-Fi beacons (e.g., Wi-Fi Direct® beacons). For example, the beacons 134*a-g* are devices including one or more processors that can facilitate wireless communication between computing devices (e.g., between a server and a client device, between an access point and a client device, etc.). Alternatively, one or more of the beacons 134*a-g* may be Bluetooth beacons or dual Bluetooth/Wi-Fi beacons. Additionally or alternatively, one or more of the beacons 134*a-g* may support different wireless communication protocols. Although seven of the beacons 134*a-g* are depicted in FIG. 1B, fewer or more than the beacons 134*a-g* depicted may be used.

In the illustrated example of FIG. 1B, the beacons 134*a-g* are disposed in a plurality of locations throughout the process control system 102. In FIG. 1B, each of the beacons 134*a-g* are disposed in a location to generate a coverage area to include one or more field devices. A coverage area can correspond to a geographical area in which a device may be communicatively coupled to a beacon associated with the coverage area. For example, a first one of the beacons 134*a-g* may have a first coverage area that includes FI-205 118, and FIC-207. In some examples, one or more coverage areas of the beacons 134*a-g* may overlap with each other. In other examples, the coverage areas of the beacons 134*a-b* may not overlap with each other.

In some examples, the wearable devices 128, 130, 132 dynamically connect to the beacons 134*a-g* when in a coverage area that is generated and/or is otherwise associated with the beacons 134*a-g*. For example, the wearable devices 128, 130, 132 may be communicatively coupled to the network 126 via a first one of the beacons 134*a-g* when entering within range of the associated coverage area of the first beacon 134*a*. When the wearable devices 128, 130, 132 are communicatively coupled with the first beacon 134*a*, the user 104 can trigger a conversation with the VA 100 corresponding to a field device within the range of the first beacon 134*a*. For example, the user 104 can initiate a conversation with the VA 100 on the first wearable device 128 corresponding to FI-205 118. In such examples, the user 104 can invoke the VA 100 by annunciating, "Hello Virtual Assistant, provide me information about FI-205." In response to the invoking, the VA 100 can generate a request to the database 124 communicatively coupled to the network 126 via the first beacon 134a. The VA 100 can generate an audible response to the user 104 that includes information corresponding to FI-205 118.

In some examples, the VA 100 can download information to the wearable devices 128, 130, 132 that is associated with field devices within a coverage area of the beacons 134a-g upon entering the coverage area. For example, when the user 104 wearing the third wearable device 132 enters a first coverage area of the first beacon 134a, the VA 100 may query the first beacon 134a for field devices in the first coverage area. The first beacon 134a may return a list of field devices including FI-205 118 and FIC-207. The VA 100 may compare the returned list of field devices to information stored in the third wearable device 132. The VA 100 may download information not already stored in the third wearable device 132. For example, the third wearable device 132 may already have stored first information associated with FI-205 118 but has not yet stored second information associated with FIC-207. In such examples, the VA 100 can query the first beacon 134a for the second information. In some examples, the VA 100 queries the first beacon 134a for third information associated with FI-205 118 when the third information is different from the first information. In other examples, the VA 100 may replace the first information with the third information.

In some examples, the VA 100 removes information that is associated with the field devices within the coverage area of the beacons 134a-g upon leaving the coverage area. For example, when the user 104 wearing the second wearable device 130 leaves the first coverage area associated with the first beacon 134a, the VA 100 may direct the second wearable device 130 to delete information associated with FI-205 118, FIC-207, etc. In other examples, the VA 100 may direct the second wearable device 130 to delete the information when entering a second coverage area different from the first coverage area. For example, the VA 100 may direct the second wearable device 130 to replace the previously stored information associated with the first coverage area with second information associated with second field devices in the second coverage area.

Advantageously, the VA 100 can reduce a speed at which a request from the user 104 is processed by storing information associated with field devices in a beacon coverage area locally on the wearable devices 128, 130, 132 instead of retrieving information from the database 124 via the network 126. For example, when the user 104 wearing the third wearable device 132 enters the first coverage area associated with the first beacon 134a, the VA 100 may download a wiring schematic associated with FIC-205 120. In such examples, when the user 104 requests the VA 100 to display the wiring schematic, the VA 100 may direct the third wearable device 132 to display the wiring schematic on one or both glasses (e.g., on one or both displays integrated into the glasses). By locally storing the wiring schematic upon entering the first coverage area, the VA 100 can increase the speed at which the request by the user 104 is processed.

Similarly, the VA 100 can reduce a quantity of computational resources associated with maintaining the network 126 by retrieving data from information stored on the beacons 134a-g instead of querying the database 124. In some examples, the beacons 134a-g can reduce networking resources associated with the network 126 by forming a mesh network. For example, the beacons 134a-g may be arranged in the process control system 102 so that each of the beacons 134a-g are communicatively coupled to at least one of the other beacons 134a-g. In such examples, the first beacon 134a can process requests from the second through seventh beacons 134b-g and transmit the requests to the network 126 instead of the network 126 processing requests from each of the beacons 134a-g.

Figure 2:
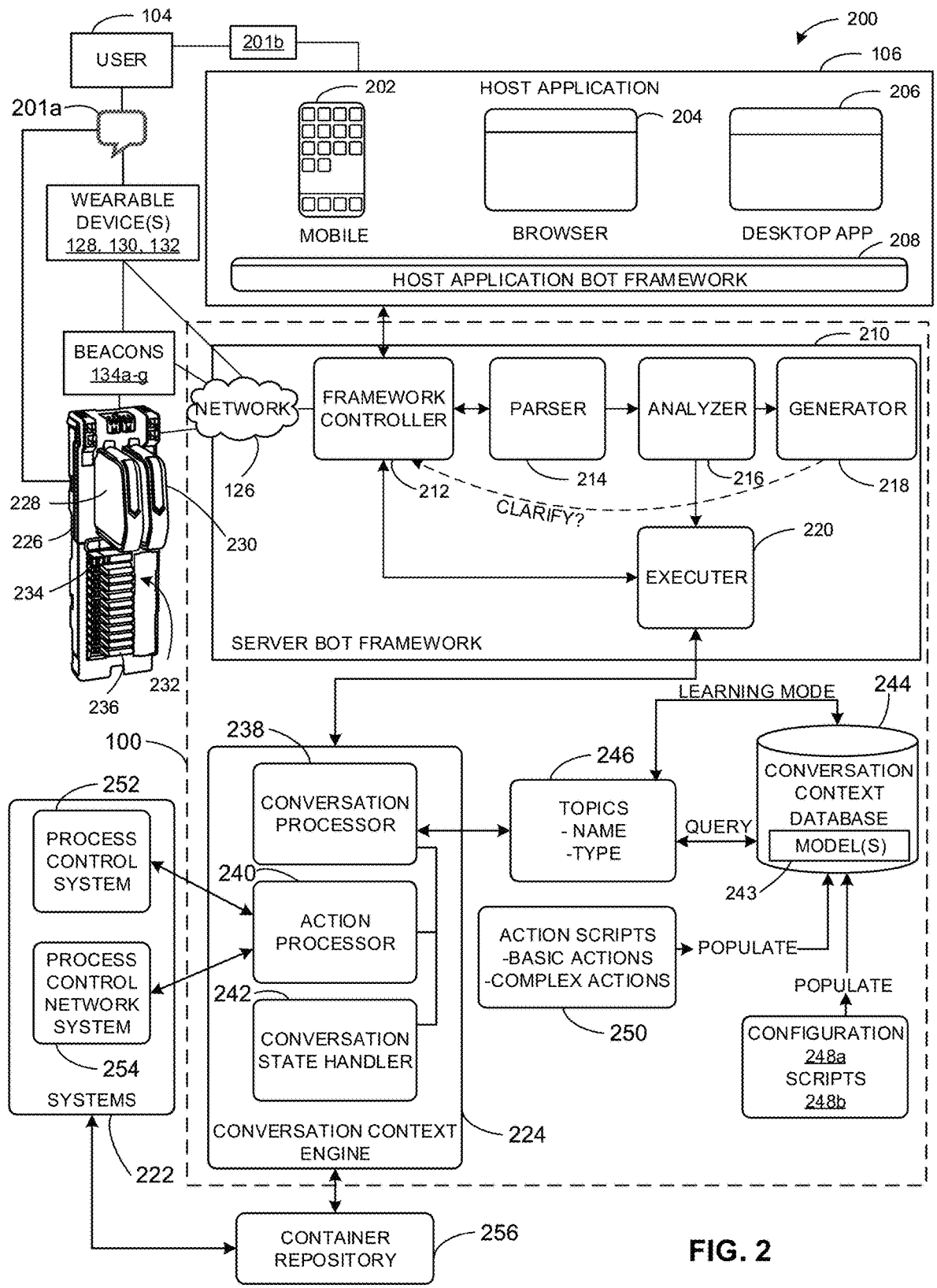
FIG. 2 is a schematic illustration of the example virtual assistant of FIG. 1A.

FIG. 2 is a schematic illustration of the VA 100 of FIGS. 1A-1B. In FIG. 2, the VA 100 is operating and/or is otherwise augmenting process control (e.g., process control operations) in an example process control environment 200. For example, the process control environment 200 can correspond to a process industry environment or system including a chemical plant, a manufacturing facility, an oilfield environment, a plant, etc. For example, the process control environment 200 may correspond to the process control system 102 of FIGS. 1A-1B. In the illustrated example of FIG. 2, the VA 100 facilitates communication (e.g., receives commands, transmits responses, etc.) with the user 104, the host application 106, etc., of FIGS. 1A-1B. In some examples, the user 104 and/or the host application 106 query the VA 100 for data or information of interest via example requests 201a-b including a first example request 201a and a second example request 201b. One or both requests 201a-b can correspond to a verbal request, a command (e.g., a verbal command), a selection in and/or an input to the host application 106, etc. For example, the user 104 can ask with the first request 201a, "What is the state of FIC-205?" In such examples, the VA 100 can return one or more parameters including the MODE, SP, PV, OUT, status, alarms, etc., and/or a combination thereof associated with the control loop 120 of FIGS. 1A-1B. In other examples, the user 104 can interact with the host application 106 by selecting the second request 201b from a pre-populated list displayed on a user interface or by generating an input by typing a text-based command or request not included in the pre-populated list such as "Find me FI*," where the wild card character depicted as an asterisk (*) can direct the VA 100 to return a list of components or field devices associated with FI or include FI in a description of the components or field devices. For example, the VA 100 can generate the list to include a name, a description, and/or corresponding path information for one or more field devices, control loops, etc., that are assigned a designator including FI (e.g., FI-201, FIC-201, FI-202, FIC-202, etc.).

In FIG. 2, the host application 106 can be an example mobile application 202. For example, the mobile application 202 can be executed and/or otherwise be operated using the first device 108, the second device 110, and/or the third device 112 of FIGS. 1A-1B. For example, the mobile application 202 can be an Apple® iOS mobile application, an Android™ mobile application, etc. For example, the mobile application 202 can be a process control based mobile application such as Emerson™ DeltaV™ Mobile.

In the illustrated example of FIG. 2, the host application 106 can be an example browser application 204. For example, the browser application 204 can implement a web browser and/or a web server where information transmitted to the VA 100, received from the VA 100, and/or otherwise exchanged with the VA 100 is formatted as an HTTP message. However, any other message format and/or (communication) protocol may additionally or alternatively be used such as, for example a file transfer protocol (FTP), a real-time transfer protocol (RTP), a simple message transfer protocol (SMTP), an HTTP secure (HTTPS) protocol, etc. For example, the browser application 204 can be a process control-based browser application built and/or otherwise generated using Emerson™ DeltaV™ Live.

The host application 106 of FIG. 2 can be an example desktop application 206. For example, the desktop application 206 can operate and/or otherwise run on an Apple® Mac® computer (e.g., a MacBook® computer, a Mac Pro® computer, etc.), a Windows-based desktop and/or laptop computer, a Linux-based desktop and/or laptop computer, etc. For example, the desktop application 206 can operate and/or otherwise run as a stand-alone application that does not require a web browser and/or Internet connection to function or operate. In other examples, the desktop application 206 can operate and/or otherwise run as a computer application that can use a web browser and/or Internet connection to function or operate.

In the illustrated example of FIG. 2, the host application 106 operating and/or otherwise executing on the mobile application 202, the browser application 204, and the desktop application 206 includes a user interface to accept and/or otherwise obtain the requests 201a-b from the user 104. For example, the VA 100 can transmit a response to the request 201a-b to the host application 106. In such examples, the host application 106 can display the response via the user interface (e.g., display a graphic including parameter values, displaying a visualization, displaying a text-based message including the response, etc.). In some examples, the host application 106 can communicate the response from the VA 100 through one or more speakers communicatively coupled to the host application 106. For example, the host application 106 can generate a verbal message representative of the response from the VA 100 and communicate the verbal message via one or more speakers coupled to a computing device executing the host application 106.

In the illustrated example of FIG. 2, the host application 106 includes one or more application programming interfaces (APIs), extensions, plug-ins, etc., and/or a combination thereof that can be used to facilitate communication with the VA 100 via an example host application bot framework 208. Alternatively, the host application 106 can communicate and/or otherwise exchange data with the VA 100 without the host application bot framework 208. In FIG. 2, the host application bot framework 208 is included in the host application 106 to queue requests and marshal requests and responses. For example, the host application bot framework 208 can process and/or otherwise manage requests (e.g., buffer requests, prioritize requests, sort requests, compare requests to responses stored in cache, etc.) to the VA 100 and responses from the VA 100.

In the illustrated example of FIG. 2, the user 104 and/or the host application 106 communicate and/or otherwise interact with the VA 100 via an example server bot framework 210. The VA 100 includes the server bot framework 210 to facilitate communication by receiving and processing commands and/or requests. For example, the server bot framework 210 can handle or manage queries from the host application 106 based on a request/response, a publish/subscribe, or an event registration with a callback architecture or schema. In some examples, the server bot framework 210 is implemented by one or more processor-based servers.

In some examples, the server bot framework 210 returns responses to the user 104, the host application 106, etc., synchronously while in other examples, the server bot framework 210 returns responses asynchronously. For example, asynchronous responses can be returned as an alert, a notification, etc. In such examples, the user 104 can request a long-running workflow such as filling the process tank 122 of FIGS. 1A-1B. The server bot framework 210 can asynchronously generate and transmit responses to the host 104 (e.g., via an audible alert or notification), the host application 106 (e.g., via an audible alert and/or a visual notification on a user interface of the host application 106), and/or one of the wearable devices 128, 130, 132 either upon completion of filling the process tank 122 and/or at various milestones of filling the process tank 122 such as when the process tank 122 is 25% filled, 50% filled, 75% filled, etc. In some examples, the server bot framework 210 can generate and transmit a response including information associated with the long-running workflow such as a fill rate of the process tank 122, a flow rate through the first field device 116 of FIGS. 1A-1B, a sensor measurement of the second field device 118 of FIGS. 1A-1B, etc., along with and/or included in the alert or notification.

In the illustrated example of FIG. 2, the server bot framework 210 includes an example framework controller 212, an example parser 214, an example analyzer 216, an example generator 218, and an example executer 220 to handle and/or otherwise manage interactions with the host application 106. Alternatively, the server bot framework 210 may include fewer or more components than depicted in FIG. 2. Alternatively, the components included in the server bot framework 210 depicted in FIG. 2 may be combined, divided, re-arranged, omitted, eliminated, and/or implemented in any other way.

In the illustrated example of FIG. 2, the server bot framework 210 includes the framework controller 212 to facilitate interactions between (1) the user 104, the host application 106, one of the wearable devices 128, 130, 132, etc., and (2) the server bot framework 210. In some examples, the framework controller 212 determines a configuration and/or type of request management system to use when managing requests. For example, the framework controller 212 can determine to facilitate communication or data transfers with the user 104, the host application 106, the wearable devices 128, 130, 132, etc., based on a request/response, publish/subscribe, event registration with callbacks, and/or any other message handling schema.

In some examples, the framework controller 212 determines a response management system to manage responses to the requests 201a-b received and/or otherwise obtained from the user 104, the host application 106, and/or the wearable devices 128, 130, 132. For example, the framework controller 212 can determine to transmit and/or otherwise return responses to the user 104, the host application 106, and/or the wearable devices 128, 130, 132 either asynchronously or synchronously. For example, the framework controller 212 can determine to asynchronously return a response to the user 104 as a notification based on determining that the initial request 201a-b from the user 104 is a relatively long-running workflow (e.g., a command to initiate filling the process tank 122 of FIGS. 1A-1B). In other examples, the framework controller 212 can determine to synchronously return a response to the host application 106 based on determining that the initial request from the host application 106 is a request for information (e.g., a request for a version of firmware associated with the first field device 116 of FIGS. 1A-1B).

In the illustrated example of FIG. 2, the server bot framework 210 includes the parser 214 to determine and/or otherwise identify elements (e.g., discernable elements, distinct components, etc.) included in the request 201a-b from the user 104, the host application 106, and/or the wearable devices 128, 130, 132. In some examples, the parser 214 includes a tokenizer to perform tokenization, or a process or method to demarcate and/or classify sections of a string of input characters. For example, the parser 214 can break or segment a stream of words included in the first request 201a by the user 104 into tokens that are obtained by the analyzer 216 for further processing. Additionally or alternatively, the parser 214 may determine elements of the first request 201a in any other way.

In some examples, the parser 214 performs dimension reduction to reduce and/or otherwise eliminate elements in the first request 201a that do not add substantive recognition value by the server bot framework 210. For example, the parser 214 can filter and/or otherwise eliminate extraneous or unidentifiable audible noises from the first request 201a from the user 104 to reduce a quantity or duration of processing power required to process the first request 201a by the server bot framework 210. In other examples, the parser 214 can reduce the quantity of tokens to be transferred to the analyzer 216 for processing. For example, the parser 214 can eliminate tokens associated with non-actionable, filler, or extraneous words such as "um," "the," etc., from the first request 201a from the user 104 prior to transferring the determined tokens to the analyzer 216.

In some examples, the parser 214 identifies and/or otherwise determines expressions (e.g., regular expressions, typical expressions, etc.) based on the request from the user 104, the host application 106, and/or the wearable devices 128, 130, 132. For example, the parser 214 can determine that the request 201a-b is based on a generic question such as "What is the state of FIC-201?", "Where is FV-106 located?", etc. In such examples, the parser 214 can determine typical phrases such as "What is the state of," "Where is," etc., and determine a response based on the requested component (e.g., FIC-201, FV-106, etc.) that follows the typical phrase. In some examples, the parser 214 includes image recognition hardware (e.g., one or more hardware accelerators) and/or software to identify elements of a gesture-based request (e.g., a waving of a hand, a thumbs-up gesture to acknowledge a response from the VA 100, etc.).

In some examples, the parser 214 performs information extraction based on the request 201a-b. For example, the parser 214 can identify a field device, a control loop, etc., associated with the request 201a-b based on extracting the name and/or type of the field device being requested. In other examples, the parser 214 can identify a type of the request 201a-b (e.g., a command, a location request, a maintenance step request, etc.) based on extracting information from the request 201a-b.

In the illustrated example of FIG. 2, the server bot framework 210 includes the analyzer 216 to validate the request 201a-b from the user 104, the host application 106, the wearable devices 128, 130, 132, etc. In some examples, the analyzer 216 performs one or more validation or verification checks including grammar checks, spelling checks, semantic checks, etc., to determine if an expression tokenized by the parser 214 is a valid expression. For example, the analyzer 216 can determine if the parser 214 generated one or more tokens that, when assembled to form an expression, can return a valid response by the VA 100.

In the illustrated example of FIG. 2, the server bot framework 210 includes the generator 218 to compile, generate, and/or otherwise produce a set of actions including one or more searches, responses, scripts, and/or templates. In some examples, the generator 218 performs a search based on the request 201a-b. For example, the generator 218 can perform a search based on a query of "What is the status of FIC-201?", to which the generator 218 can search one of example systems 222 of FIG. 2 for the status, formulate an example response of "The status of FIC-201 is closing FV-101" based on the search, and transmit the example response to the user 104, the host application 106, the wearable devices 128, 130, 132, etc.

In some examples, the generator 218 can generate at least one of a script or a template based on the request 201a-b. In such examples, the generator 218 can transmit the script or the template to the executer 220. For example, the request 201a-b from the user 104 can correspond to a long-running workflow, or a workflow including multiple steps or points of completion. For example, the long-running workflow requested by the user 104 can be "What are the steps to replace a seal in FV-105?" In such examples, the generator 218 can create a template based on at least one of a field device type corresponding to FV-105, a component of the field device type being asked about, or an identification of the user 104. For example, the template can include a set of steps organized into individual steps, where each of the steps of the set includes one or more instructions to perform the step, one or more tools to perform the step, and/or one or more validation steps ensuring that the one or more instructions are performed correctly. In such examples, the template can include a response for each of the steps that can be communicated to the user 104 when the user 104 acknowledges that the step has been completed or if the user 104 requests additional information. For example, the response can be information associated with the next step or can be a response to a query (e.g., the request 201a-b) by the user 104 associated with the current step being performed, a tool corresponding to the current step, etc.

In some examples, the generator 218 formulates a response to request additional information from a source of the request. For example, the generator 218 can generate a response to the user 104 asking for clarification or additional information when the user 104 requests information regarding a field device that is not included in the process control system 102, requests to perform an action on a field device that is not supported by the field device, etc. In such examples, the generator 218 can request additional information from the user 104 to verify an accuracy of the request processed by the server bot framework 210. In some examples, the generator 218 determines that the request is an erroneous request (e.g., a frequently received erroneous request) and generates a response including a suggested alternative to the request 201a-b and/or corresponding information describing why the original request 201a-b is incorrect and/or why the suggested alternative can be executed in place of the original request 201a-b.

In the illustrated example of FIG. 2, the server bot framework 210 includes the executer 220 to facilitate an action or command based on a request from the user 104, the host application 106, and/or the wearable devices 128, 130, 132. For example, the executer 220 can receive a script, a template, etc., from the generator 218. In some examples, the executer 220 triggers and/or otherwise initiates a script, a template, and/or an action based on the request 201a-b. For example, the executer 220 can transmit a command based on a JavaScript Object Notation (JSON) formatted command structure to an example conversation context engine 224. In response to the transmitting, the conversation context engine 224 can generate a command to open the first field device 116 of FIG. 1A in response to the user 104 requesting to open the first field device 116. In other examples, the executer 220 can trigger a template to fill the process tank 122 of FIGS. 1A-1B and generate notifications at one or more steps or completion points of the template. For example, the executer 220 can transmit a script, a template, etc., to the conversation context engine 224 to trigger a filling of the process tank 122. In other examples, the executer 220 can trigger a script in response to the user 104 requesting information associated with the first field device 116, the second field device 118, etc.

In some examples, the executer 220 updates an example model 243 included and/or otherwise stored in an example conversation context database 244. In some examples, the conversation context database 244 includes more than one model 243. For example, the models 243 can correspond to one or more machine-learning models, one more neural networks (e.g., artificial neural networks), etc. For example, the executer 220 can update the model 243 used to process requests from the user 104, the host application 106, one or more of the wearable devices 128, 130, 132, etc. In such examples, the executer 220 can trigger an example conversation context engine 224 to update the model 243 included in the conversation context database 244 associated with the VA 100. In some examples, the model 243 is re-configured, updated, etc., based on a new configuration of the process control system 102 of FIGS. 1A-1B. For example, the process control system 102 can be modified by removing and/or adding one or more field devices, modifying one or more control loops, etc., that can affect responses generated by the server bot framework 210 and/or, more generally, the VA 100.

The model(s) 243 stored in the conversation context database 244 can correspond to an artificial neural network. An artificial neural network is a computer system architecture model that learns to do tasks and/or provide responses based on evaluation or "learning" from examples having known inputs and known outputs. A neural network such as the model(s) 243 stored in the conversation context database 244 can feature a series of interconnected nodes referred to as "neurons" or nodes. Input nodes are activated from an outside source/stimulus, such as inputs from the executer 220 (e.g., the request 201*a-b* from the user 104, a response generated by the generator 218, etc.). The input nodes activate other internal network nodes according to connections between nodes (e.g., governed by machine parameters, prior relationships, etc.). The connections are dynamic and can change based on feedback, training, etc. By changing the connections, an output of the artificial neural network can be improved or optimized to produce more/most accurate results. For example, the model(s) 243 stored in the conversation context database 244 can be trained using information from one or more sources to map inputs to a response, etc., to improve an accuracy of a response, reduce a time required to generate the response, etc., and/or a combination thereof.

Machine learning techniques, whether neural networks, deep learning networks, support vector machines, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

For example, deep learning that utilizes a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image (e.g., an image of a gesture-based request), for example, rather than looking for an object, it is more efficient to look for edges which form motifs which form parts, which form the object being sought. These hierarchies of features can be found in many different forms of data.

Learned observable features include objects and quantifiable regularities learned by the machine during supervised learning. A machine provided with a large set of well classified data is better equipped to distinguish and extract the features pertinent to successful classification of new data. A deep learning machine that utilizes transfer learning can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved. Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The model(s) 243 included in the conversation context database 244 is/are then in a state of transfer learning, as parameters for classification that determine neural network behavior are updated based on ongoing interactions. In certain examples, the artificial neural network such as the model(s) 243 stored in the conversation context database 244 can provide direct feedback to another process, such as the elements parsed by the parser 214, the responses generated by the generator 218, etc. In certain examples, the model(s) 243 output data that is buffered (e.g., via the cloud, etc.) and validated before it is provided to another process.

In some examples, the executer 220 updates an objective based on the request 201*a-b* from the user 104, the host application 106, the wearable devices 128, 130, 132, etc. For example, the executer 220 can update an objective of a template, a script, etc., based on a request from the user 104 to cancel an action, process, operation, etc., associated with a previous request. For example, the user 104 can ask the VA 100 to fill the process tank 122 of FIGS. 1A-1B in a first request and ask the VA 100 to cancel filling the process tank 122 in a second request, where the first request is made prior to the second request. In such examples, the executer 220 can generate a command to stop filling the process tank 122 by canceling and/or otherwise stopping a script, a template, etc., generated in response to the first request. In some examples, the executer 220 generates actions in response to updating the objective. For example, the executer 220 can generate a command to purge the process tank 122 in response to the user 104 requesting to stop filling the process tank 122. In such examples, the executer 220 can communicate information associated with the command to the user 104 to ensure that the user 104 approves the command prior to the executer 220 facilitating an execution of the command.

In some examples, the executer 220 updates a dialog or a response plan. For example, the executer 220 can generate a script or a template based on the request 201a-b from the user 104, the host application 106, the wearable devices 128, 130, 132, etc. For example, the executer 220 can generate a script based on the user 104 asking "What is the status of FV-105?" The executer 220 can generate the script to include responses or levels of responses to potential questions that the user 104 can ask associated with FV-105, a device coupled to FV-105, or a control loop including FV-105. In such examples, the executer 220 can update a dialog associated with the script when the user 104 asks a follow-up question to a response generated and communicated by the generator 218, the executer 220, etc. For example, the executer 220 can determine that the user 104 has transitioned from a first level of questions and corresponding responses to a second level of questions and corresponding responses based on the user 104 asking for more specific information in a follow-up request.

In the illustrated example of FIG. 2, the user 104 can interact with the VA 100 via an example DCS controller assembly 226. For example, the DCS controller assembly 226 can be an Emerson™ DeltaV™ S-Series DCS system. For example, the DCS controller assembly 226 can be one or more programmable logic controllers (PLC) or any other process controller used for industrial or process automation. Alternatively, the DCS controller assembly 226 may be any other type of DCS system. The DCS controller assembly 226 of FIG. 2 includes a first controller 228 and a second controller 230. In FIG. 2, the first and the second controllers 228, 230 are characterization module (CHARM) I/O cards (CIOC). Alternatively, any other number or types of electronic controllers may be used. The first and the second controllers 228, 230 perform data acquisition and control operations such as obtaining and processing sensor measurements, transmitting the sensor measurements to an external controller and/or DCS, etc. For example, the first and second controllers 228, 230 can be included in the process control system 102 of FIG. 1A to control and/or monitor the first field device 116, the second field device 118, etc.

The first and the second controllers 228, 230 of FIG. 2 are electrically coupled to I/O modules 232 via terminal blocks 234. The I/O modules 232 are removably coupled to the terminal blocks 234. The I/O modules 232 of FIG. 2 are CHARMs. Alternatively, any other type of input and/or output module used for data acquisition and control may be used. Each CHARM is an individual input and/or output channel for the first and the second controllers 228, 230. For example, each one of the I/O modules 232 can be an analog input or output channel, a digital input or output channel, a relay channel, etc. Each of the I/O modules 232 can include analog-to-digital (A/D) conversion circuitry, signal isolation circuitry, etc.

In the illustrated example of FIG. 2, a first one of the I/O modules 236 is a VA module. In some examples, the VA module 236 can facilitate an interaction of the DCS controller assembly 226 with (1) the VA 100 via the network 126, (2) one or more of the beacons 134a-g, and/or (3) one or more of the wearable devices 128, 130, 132 of FIG. 1B. For example, the first wearable device 128 can transmit the first request 201a to the first beacon 134a which, in turn, can transmit the query to the VA module 236 which, in turn, can query the VA 100 via the network 126 for information associated with the field device 118 of FIGS. 1A-1B. In such examples, the VA module 236 can store the information in a mass storage disk or storage device included in the DCS controller assembly 226 and/or communicate the information to the user 104. For example, the VA module 236 can facilitate an interaction (e.g., communicate information to and/or obtain the first request 201a from the user 104) of the user 104 with the VA 100. For example, the VA module 236 can include one or more speakers and/or one or more microphones. In such examples, the VA module 236 can use the one or more microphones to listen and/or otherwise obtain the first request 201a from the user 104. The VA module 236 can use the one or more speakers to communicate and/or otherwise transmit a response to the first request 201a to the user 104.

In some examples, the VA module 236 translates the first request 201a into one or more digital signals that can be transmitted to the server bot framework 210 via the network 126 of FIGS. 1A-1B. In response to the server bot framework 210 receiving the one or more digital signals, the server bot framework 210 can translate and/or otherwise convert the one or more digital signals into tokens via the parser 214. The server bot framework 210 can analyze the tokens, determine a response based on the tokens, and convert the response into one or more digital signals to be transmitted to the VA module 236 via the network 126, the DCS controller assembly 226, etc. In response to the VA module 236 receiving the one or more digital signals, the VA module 236 converts the one or more digital signals into sound via the one or more speakers included in the VA module 236 to communicate the response to the user 104.

Alternatively, the functions of the VA module 236 may be incorporated and/or otherwise integrated into at least one of the first controller 228 or the second controller 230. For example, the one or more microphones and/or the one or more speakers may be integrated into the DCS controller assembly 226, the first controller 228, and/or the second controller 230. In some examples, the VA module 236 is a standalone device that can be communicatively coupled to at least one of the DCS controller assembly 226 (e.g., via a wired connection, a wireless connection, etc.), one or more of the beacons 134a-g, and/or the VA 100.

In the illustrated example of FIG. 2, the VA 100 includes the conversation context engine 224 to manage and/or otherwise process requests from the user 104, the host application 106, the wearable devices 128, 130, 132, the DCS controller assembly 226, etc., based on conversation context. For example, the user 104 can ask the VA 100 for information and/or a status associated with the first controller 228, the second controller 230, etc., of the DCS controller assembly 226. In such examples, the status can correspond to a health of the first controller 228, a firmware version of the second controller 230, a health of one or more of the I/O modules 236, etc. In some examples, a conversation corresponds to an interaction with the VA 100. For example, a conversation can correspond to the user 104 verbally communicating and/or receiving information from the VA 100 via the beacons 134*a*-*g,* the wearable devices 128, 130, 132, the VA module 236, etc. In other examples, the conversation can correspond to the host application 106 transmitting requests to and/or receiving responses from the VA 100. In some examples, the conversation context engine 224 is implemented by one or more processor-based servers. In some examples, the server bot framework 210 and the conversation context engine 224 are implemented by the same one or more processor-based servers. In other examples, the server bot framework 210 is implemented by one or more processor-based servers separate from the one or more processor-based servers that implement the conversation context engine 224.

In some examples, the conversation context corresponds to requests, responses, etc., associated with process industries including chemical plants, manufacturing facilities, oilfield environments, etc. In some examples, the conversation context engine 224 and/or, more generally, the VA 100 can generate responses using conversation context based on a system configuration associated with the process control system 102 of FIGS. 1A-1B. For example, the conversation context engine 224 can generate responses to requests from the user 104, the host application 106, the wearable devices 128, 130, 132, etc., based on a process control device configuration (e.g., a DeltaV database configuration), an asset management software (AMS) database, a recipe, and/or other process relevant information.

The conversation context engine 224 of FIG. 2 includes an example conversation processor 238, an example action processor 240, and an example conversation state handler 242 to process and/or otherwise manage requests processed by the server bot framework 210. For example, the conversation context engine 224 can establish a context based on a configuration of the process control system 102, identify a topic associated with the context (e.g., a request associated with the first field device 116, the second field device 118, etc.), and determine one or more actions associated with the topic. For example, the conversation context engine 224 can determine that the context of the request 201*a*-*b* from the user 104, the host application 106, the wearable devices 128, 130, 132, etc., is the process control system 102 of FIGS. 1A-1B. The conversation context engine 224 can tailor and/or otherwise generate process-centric responses based on determining that the context of the request is the process control system 102. The conversation context engine 224 can determine that the context of the request is the process control system 102 by mapping an identified topic included in the request to the configuration loaded in the database 124 of FIGS. 1A-1B, the conversation context database 244 of FIG. 2, etc. In such examples, the conversation context engine 224 can execute one or more scripts to perform the one or more actions, return information associated with the topic, etc., and/or a combination thereof.

In the illustrated example of FIG. 2, the conversation context engine 224 includes the conversation processor 238 to assemble, compile, and/or otherwise aggregate scripts or other lists of automated tasks, where each task includes one or more actions. For example, the conversation processor 238 can obtain the request 201*a*-*b* from the user 104 via the server bot framework 210. The conversation processor 238 can identify one or more actions, one or more parameters to return (e.g., one or more values of parameters to return), etc., and/or a combination thereof based on the request. For example, the user 104 can issue a request such as "Show me FV-105." The server bot framework 210 can process the request and transmit the processed request to the conversation processor 238. The conversation processor 238 can identify the request as a request for information associated with a field device assigned the designator FV-105. In such examples, the conversation processor 238 retrieves parameters associated with the field device including MODE, OUT, STATUS, etc., aggregates the retrieved parameters into a response, and transmits the response to the user 104 via the server bot framework 210. In some examples, the response is communicated to the user 104 via a verbal communication. In some examples, the response is communicated to the user 104 via the host application 106 (e.g., displaying the response on a display, communicating the response with a speaker coupled to a computing device, etc.).

The conversation processor 238 of FIG. 2 aggregates scripts based on information retrieved and/or otherwise obtained from the example conversation context database 244. In some examples, the conversation processor 238 queries the conversation context database 244 for information based on an example topic 246. For example, the conversation processor 238 can map the topic 246 based on a field device name or description, a field device type, etc., to information included in the conversation context database 244. In such examples, the conversation processor 238 can map the topic 246 including a name or a description of a field device (e.g., FV-105, FIC-205, etc.) to an example configuration 248*a,* an example script 248*b,* etc., associated with the topic 246. For example, the conversation processor 238 can obtain a MODE, OUT, and STATUS parameter for the first field device 116 of FIGS. 1A-1B in response to mapping the topic 246 of FV-105 associated with the first field device 116 to the conversation context database 244 for FV-105.

In some examples, the conversation processor 238 maps the topic 246 including a type of a field device (e.g., a valve, a pressure transmitter, a process tank, etc.) to a configuration, a script, etc., associated with the topic 246. For example, the conversation processor 238 can obtain a list of field devices that matches and/or is otherwise associated with the topic 246. In such examples, the conversation processor 238 can obtain a list of valves including FV-101, FV-102, FV-103, etc., of FIG. 1A by mapping the topic 246 of "Valve" (e.g., a request by the user 104 such as "What valves are operating?") to the conversation context database 244 based on the identified context of the process control system 102.

In some examples, the conversation processor 238 aggregates and/or otherwise generates a script, a template, etc., by retrieving one or more example actions 250 from the conversation context database 244 based on the topic 246. For example, the conversation processor 238 can map the topic 246 (e.g., a name, a device type, etc.) to the conversation context database 244. Based on the mapping, the conversation processor 238 can retrieve one or more actions 250 from the conversation context database 244 and generate the script, the template, etc., based on the retrieved actions 250. In some examples, the actions 250 are basic actions. For example, a basic action can correspond to a one-to-one request to command type action such as a request to open a valve and a corresponding command to open the valve. In other examples, the basic action can correspond to a request for information (e.g., a parameter value, safety information, etc.). For example, a basic action can correspond to a one-to-one request for information such as a request for current safety alerts and a corresponding request including one or more safety alerts or an acknowledgement that there are no safety alerts to report.

In some examples, the actions 250 are complex actions. For example, a complex action can correspond to a workflow including two or more actions such as a request to fill the process tank 122 of FIGS. 1A-1B. In such examples, the complex action includes an action to open FV-101 and/or FV-102 of FIGS. 1A-1B, obtaining a flow rate measurement via FI-201 and/or FI-202, and measuring a level of the process tank 122 via FI-206, FI-207, and/or FI-208. For example, the conversation processor 238 can obtain the complex action associated with the request to fill the process tank 122 and generate a script to execute the complex action based on the retrieved complex action including the associated actions 250. In some examples, the actions 250 include a script to execute the basic action, the complex action, etc.

In the illustrated example of FIG. 2, the conversation context engine 224 includes the action processor 240 to execute and/or otherwise facilitate a script generated by the conversation processor 238. In some examples, the action processor 240 executes a script or a set of commands, instructions, etc., by interacting with one or more of the systems 222 of FIG. 2. The systems 222 of FIG. 2 include an example process control system 252 and an example process control network system 254. Alternatively, the systems 222 may include fewer or more systems than depicted in FIG. 2.

The process control system 252 of FIG. 2 is a system that monitors and/or controls aspects of an operation to be conducted in a process environment, such as, for example, manufacturing components, processing raw chemical materials, etc. For example, the process control system 252 of FIG. 2 can correspond to the process control system 102 of FIGS. 1A-1B. The process control system 252 of FIG. 2 can include at least one controller (e.g., the first controller 228, the second controller 230, etc.) with accompanying inputs and outputs, allowing the controller(s) to acquire signals from various input field devices and/or instruments and control various output field devices and/or instruments. For example, the process control system 252 of FIG. 2 can correspond to an Emerson™ DeltaV™ Distributed Control System (DCS) including at least one Emerson™ DeltaV™ controller.

In some examples, the action processor 240 facilitates an execution of a script by generating and/or transmitting commands to the process control system 252 of FIG. 2. For example, the action processor 240 can generate a command to open the first field device 116 of FIGS. 1A-1B and transmit the command to a controller managing the control loop 120 to open the first field device 116. In other examples, the action processor 240 can generate a set of commands to be executed either concurrently or sequentially by the process control system 252 of FIG. 2. For example, the action processor 240 can generate a set of commands to fill the process tank 122 of FIGS. 1A-1B by substantially simultaneously (e.g., at the same time in accordance with physical limitations of a commanded field device, propagation delays, processing delays, etc.) opening FV-101, FV-102, and FV-103 and disabling a fluid pump (FP) such as FP-101 depicted in FIGS. 1A-1B.

In some examples, the action processor 240 facilitates an execution of a script by requesting information from the process control system 252. For example, the action processor 240 can obtain information associated with the first field device 116 including one or more parameter values. For example, the action processor 240 can query the control loop 120 (e.g., query a controller controlling the control loop 120) for the MODE, OUT, Status, etc., parameters associated with the first field device 116, the second field device 118, etc. In response to the querying, the action processor 240 can obtain the one or more parameter values and transmit the one or more parameter values to the conversation processor 238 for packaging into a response.

The process control network system 254 of FIG. 2 is a system that is communicatively coupled to at least one of the process control system 252 or the VA 100. In some examples, the process control network system 254 is a cloud-based network that monitors and/or controls multiple process control systems. For example, the process control network system 254 can correspond to one or more Open Platform Communications (OPC) servers converting hardware communication protocols from a plurality of controllers included in a plurality of process control systems into the OPC protocol and/or any other communication protocol. In some examples, the process control network system 254 can perform cloud-based data storage, analytics, big data analysis, deep machine learning, etc., to enable multi-process control environment scale modeling, digital process control high-efficiency operations and automation, prognostic health monitoring, component reliability analysis, process control management, and/or optimization based on information obtained and/or processed by a plurality of process control systems (e.g., the process control system 102 of FIGS. 1A-1B).

In some examples, the action processor 240 facilitates an execution of a script by generating and/or transmitting commands to the process control network system 254. For example, the action processor 240 can generate a command to perform an emergency shutdown of two or more process control systems included in and/or otherwise monitored by the process control network system 254. For example, the action processor 240 can generate and transmit a set of actions that the process control network system 254 can implement to perform an emergency shutdown.

In some examples, the action processor 240 facilitates an execution of a script by requesting information from the process control network system 254. For example, the action processor 240 can query the process control network system 254 to determine prognostic health monitoring information associated with the first field device 116. For example, the user 104 can request the VA 100 to estimate a quantity of life cycles remaining for the first field device 116. In such examples, the action processor 240 can transmit information including a serial number, a manufacturer part number, a device type, a quantity of cycles performed (e.g., a quantity of valve open and close operations), a time duration since a last maintenance event, etc., associated with the first field device 116 to the process control network system 254. In response to receiving the information, the process control network system 254 can map the information to previously analyzed field devices with substantially similar information (e.g., the same manufacturer part number, a quantity of cycles within a tolerance of 100 cycles, a time duration within 5 days, etc.) and determine a failure rate (e.g., an average failure rate, a range of failure rates, etc.) based on data associated with the previously analyzed field devices. In response to at least the mapping and the determination, the process control network system 254 can transmit the failure rate and/or other prognostic health monitoring information to the action processor 240, to which the action processor 240 can transmit the failure rate and/or other prognostic health monitoring information to the conversation processor 238 for including in a response to the server bot framework 210. For example, the action processor 240 can transmit a failure rate including a time duration until expected failure, a quantity of cycles until expected failure, etc., to the user 104, the host application 106, the wearable devices 128, 130, 132, etc. In such examples, the action processor 240 can transmit a safety alert based on the failure rate, an impending failure, etc.

In the illustrated example of FIG. 2, the conversation context engine 224 includes the conversation state handler 242 to store and/or otherwise maintain a state of a conversation initiated by the user 104, the host application 106, the wearable devices 128, 130, 132, etc. In some examples, the conversation state corresponds to an identified topic based on a request. For example, the conversation state handler 242 can assign and/or otherwise associate a topic such as FV-105 to the conversation state. In such examples, the conversation state handler 242 can enable the user 104, the host application 106, the wearable devices 128, 130, 132, etc., to request additional details or levels of information on the topic of FV-105, drill deeper into the topic, or use the topic to branch off or transition to another topic (e.g., a related topic) of interest such as FIC-205, FI-205, etc. For example, the conversation state handler 242 can reduce computing power used by the conversation processor 238 to process additional requests by referencing the conversation state to generate and/or otherwise package responses. For example, the conversation processor 238 can provide the user 104 with additional actions that can be completed by FV-105, inform the user 104 of additional components communicatively coupled to FV-105, etc., by querying the conversation state handler 242 for the conversation state instead of processing the request without working from a baseline or starting point.

In some examples, the conversation state corresponds to a status (e.g., a completion status) of a script being executed by the action processor 240. For example, the action processor 240 can execute a workflow such as providing the user 104 with step-by-step instructions on how to replace the first field device 116 of FIGS. 1A-1B with a substantially similar field device (e.g., a field device of the same model, manufacturer part number, operating ratings, hazardous area classification, etc.). In such examples, the action processor 240 can transmit a current or instant step or operation being executed by the action processor 240, a subsequent step or operation to be executed, a total quantity of steps or operations to be executed, etc., to the conversation state handler 242. In response to receiving the information from the action processor 240, the conversation state handler 242 can provide information to the conversation processor 238 to generate responses to the user 104. For example, the conversation state handler 242 can transmit a next step or operation to be executed, a completion status (e.g., a quantity of steps to be completed, an estimated time duration to complete the steps, etc.), etc., to the conversation processor 238, to which the conversation processor 238 can generate and communicate a response to the user 104 based on the information received from the conversation state handler 242.

In some examples, the conversation state handler 242 modifies or updates a conversation state. For example, the conversation state handler 242 can update a conversation state based on a new topic requested by the user 104, the host application 106, the wearable devices 128, 130, 132, the DCS controller assembly 226, etc. For example, the conversation state handler 242 can change the conversation state from FV-105 to FV-106 based on the user 104 asking for information about FV-106. In some examples, the conversation state handler 242 cancels or deletes a conversation state. For example, the conversation state handler 242 can disassociate FV-105 from the conversation state and/or cancel the conversation state of FV-105 based on at least one of the user 104 canceling the conversation with the VA 100, asking information about another field device such as FV-104, or the user 104 informing the VA 100 that no additional information corresponding to FV-105 is needed.

In some examples, the conversation state handler 242 speculatively branches or transitions to a new topic. For example, the conversation state handler 242 can determine that the user 104 has left a first coverage area of the first beacon 134a and has entered into a second coverage area of the second beacon 134b. In such examples, the conversation state handler 242 can instruct the action processor 240 to query the process control network system 254 to determine a likely next topic of interest based on one or more field devices included in the second coverage area.

In some examples, the conversation state handler 242 speculatively branches to a new topic when the conversation state handler 242 determines that the user 104, the host application 106, etc., has exhausted all possible or potential responses associated with a topic associated with filling the process tank 122. In such examples, the conversation state handler 242 can instruct the action processor 240 to query the process control network system 254 to determine a likely next topic of interest. For example, the process control network system 254 can perform and/or otherwise execute a machine-learning algorithm to determine a topic that was selected after filling a process tank in other process control systems (e.g., one or more process control systems external to the process control system 102 of FIGS. 1A-1B). For example, the process control network system 254 can determine that a topic associated with emptying the process tank was selected in a substantial portion of the time (e.g., 40% of the time, 75% of the time, etc.) after filling the process tank. In such examples, the process control network system 254 can transmit the speculatively identified topic to the conversation state handler 242 via the action processor 240. In such examples, the conversation state handler 242 can instruct the conversation processor 238 to map the new topic to one or more actions, one or more configurations, one or more scripts, etc., included in the conversation context database 244.

By speculatively fetching the new topic, the conversation processor 238 can provide responses to the user 104 if the user 104 issues a request associated with the new topic. The conversation processor 238 can attempt to predict a next step and/or otherwise get ahead of the user 104 during time periods that the conversation processor 238 may be idle, not processing a request, etc. In some examples, the conversation processor 238 prompts the user 104 to perform an action associated with the speculatively fetched topic. For example, the user 104 may have forgotten to perform an action and is reminded to perform the action by being prompted by the VA 100 regarding the speculatively fetched topic. If the user 104 issues a request associated with a different topic than the speculatively fetched topic, then the conversation processor 238 can prompt the user 104 to determine if the user 104 would rather select the speculatively fetched topic. Alternatively, if the user 104 declines to select the speculatively fetched topic, then the conversation processor 238 can direct the conversation state handler 242 to replace the speculatively fetched topic with the requested topic.

In the illustrated example of FIG. 2, the conversation context engine 224 can support conversations that are instantiated on external computing systems such as an example container repository 256. The container repository 256 includes containers or container images corresponding to lightweight, stand-alone, executable packages of software that includes everything needed to execute the software including code, runtime, system tools, system libraries, and settings. Containers isolate software from the software surroundings, for example differences between development and staging environments.

In some examples, the conversation context engine 224 queries the container repository 256 to determine if a topic (e.g., a long-running workflow, a complex topic, etc.) has a corresponding container that can execute the topic. In response to determining that the topic has a corresponding container, the conversation context engine 224 can instruct the corresponding container to execute the topic. For example, the container in the container repository 256 can execute software (e.g., machine-readable instructions) to execute actions associated with the topic. The container can transmit commands to the systems 222, conversation states to the conversation context engine 224, notifications to the user 104 via the conversation context engine 224, etc. In such examples, the conversation context engine 224 can delegate and/or otherwise offload complex topics to external systems (e.g., a container in the container repository 256, one or more of the systems 222, etc.) to reduce processing utilization, memory resources, storage resources, etc., of the conversation context engine 224.

While an example manner of implementing the VA 100 of FIGS. 1A-1B is illustrated in FIG. 2, one or more of the elements, processes, and/or devices illustrated in FIG. 2 may be combined, divided, re-arranged, omitted, eliminated, and/or implemented in any other way. Further, the example server bot framework 210, the example framework controller 212, the example parser 214, the example analyzer 216, the example generator 218, the example executer 220, the example conversation context engine 224, the example conversation processor 238, the example action processor 240, the example conversation state handler 242, the example conversation context database 244, the example topics 246, the example configurations 248a, the example scripts 248b, the example actions 250, and/or, more generally, the example VA 100 of FIG. 2 may be implemented by hardware, software, firmware, and/or any combination of hardware, software, and/or firmware. Thus, for example, any of the example server bot framework 210, the example framework controller 212, the example parser 214, the example analyzer 216, the example generator 218, the example executer 220, the example conversation context engine 224, the example conversation processor 238, the example action processor 240, the example conversation state handler 242, the example conversation context database 244, the example topics 246, the example configurations 248a, the example scripts 248b, the example actions 250, and/or, more generally, the example VA 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example server bot framework 210, the example framework controller 212, the example parser 214, the example analyzer 216, the example generator 218, the example executer 220, the example conversation context engine 224, the example conversation processor 238, the example action processor 240, the example conversation state handler 242, the example conversation context database 244, the example topics 246, the example configurations 248a, the example scripts 248b, and/or the example actions 250 is/are hereby expressly defined to include a non-transitory computer readable storage device or storage disk such as a memory, a digital versatile disk (DVD), a compact disk (CD), a Blu-ray disk, etc., including the software and/or firmware. Further still, the example VA 100 of FIGS. 1A-1B may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 3 depicts an example table of an example profile 300 corresponding to the process tank 122 of the process control system 102 of FIGS. 1A-1B. The profile 300 can correspond to a portion of a configuration of the process control system 102 loaded in the database 124 of FIGS. 1A-1B, the conversation context database 244 of FIG. 2, etc. For example, the profile 300 can correspond to a topic. In such examples, the profile 300 corresponds to the topic of the process tank 122 of FIGS. 1A-1B based on the context of the process control system 102. In some examples, the VA 100 of FIGS. 1A-2 is initialized by loading a configuration associated with the process control system 102 of FIGS. 1A-1B into the conversation context database 244. The configuration can include information associated with one or more of the components of the process control system 102. For example, the configuration can include one or more parameters associated with the first field device 116, the second field device 118, etc. The configuration can include information about field devices included in the control loop 120.

In some examples, the configuration includes associations between field devices, control loops, etc., and/or a combination thereof. For example, the configuration can include an association or a relationship between FI-207, FIC-207, and FV-106 of FIGS. 1A-1B that can include a description of how FI-207, FIC-207, and FV-106 are physically coupled (e.g., a wiring diagram, a cable schedule, a termination schematic, etc.), communicatively coupled (e.g., a communication protocol addressing scheme, an Internet Protocol (IP) address table, etc.), etc. In some examples, the configuration includes a plurality of profiles including the profile 300 of FIG. 3, an association of ones of the plurality of profiles (e.g., dependencies of one profile on another profile), etc.

In some examples, the conversation processor 238 generates the profile 300. For example, the conversation processor 238 can identify a topic included in the request 201a-b of FIG. 2 from the user 104, the host application 106, etc., where the topic is the first field device 116, the process tank 122, etc. In such examples, the conversation processor 238 can map the topic of the first field device 116 to a look-up table or any other data structure included in the conversation context database 244. In other words, the conversation processor 238 can map and/or otherwise perform a mapping of the first field device 116 to the look-up table or any other data structure included in the conversation context database 244. In some examples, the look-up table is based on the configuration. For example, the look-up table can include an association of the first field device 116 with one or more parameters corresponding to one or more parameters associated with the first field device 116, one or more actions that can be executed and/or otherwise implemented by the first field device 116, etc. The conversation processor 238 can retrieve the one or more parameters, the one or more actions, etc., from the conversation context database 244 and generate a profile (e.g., the profile 300 of FIG. 3) based on at least one of the one or more parameters, the one or more actions, etc. The conversation processor 238 can store the profile 300 in the conversation context database 244 for future processing.

In the illustrated example of FIG. 3, the profile 300 includes fields such as an example level 302, an example category 304, an example parameter 306, an example tag 308, and an example description 310. The profile 300 of FIG. 3 includes the level 302 to organize information associated with the process tank 122 into a hierarchy or order of access by the VA 100. For example, a first level (L1) can correspond to a first layer of information provided to the user 104, the host application 106, etc., of FIGS. 1A-2 in response to a request. For example, the user 104 can issue a request such as "Show me the process tank" via the mobile application 202 of FIG. 2. In such examples, VA 100 can display information included in L1 to the user 104 via the mobile application (e.g., display the information on a display of a mobile device operating the mobile application 202). In other examples, the VA 100 can communicate information (e.g., verbal statements via speakers coupled to the host application 106) included in L1 to the user 104 via the host application 106. In response to the user 104 requesting for additional information such as "Show me additional information about the process tank" or "Tell me more about the process tank," the VA 100 can transmit, communicate, etc., information included in a second level (L2) to the user 104 via an audible communication, the host application 106, etc. Alternatively, the profile 300 can include fewer or more levels 302 than depicted in FIG. 3.

In the illustrated example of FIG. 3, the profile 300 includes the category 304 to organize information associated with the process tank 122 based on at least one of a frequency of the information being requested or a component of the process tank 122. For example, the category 304 can correspond to how often information included in the profile 300 is requested. For example, the category 304 can have a value of Common, Typical, Uncommon, Infrequent, etc., corresponding to a frequency of the information being requested by the user 104, the host application 106, the wearable devices 128, 130, 132, the DCS controller assembly 226, etc. In other examples, the category 304 can correspond to a component of the process tank 122 such as the Surge Drum of the process tank 122. Alternatively, the profile 300 can include fewer or more categories 304 than depicted in FIG. 3.

In the illustrated example of FIG. 3, the profile 300 includes the parameter 306 to represent values that are associated with at least one of a corresponding level 302 or category 304 of the process tank 122 of FIGS. 1A-1B. In the profile 300 of FIG. 3, the parameters 306 include a Vessel Level, a Vessel Pressure, a Flow In/Flow Out, a Temperature, and a Vessel Temperature. For example, the VA 100 can return information associated with the Vessel Level parameter to the user 104 in response to receiving an initial inquiry regarding the process tank 122. For example, the Vessel Level parameter can correspond to a value measured by FI-206, FI-208, etc., of FIGS. 1A-1B.

In the illustrated example of FIG. 3, the profile 300 includes the tag 308 to represent designators (e.g., process control designators) associated with at least the parameters 306. In some examples, the tag 308 is a software designator. For example, the tag 308 can correspond to an address and/or a label in a communication protocol, a process control schema, etc., assigned to the Vessel Level parameter associated with the process tank 122. In some examples, the tag 308 is a physical designator (e.g., a physical tag coupled to the process tank 122, a label affixed to the process tank 122 that includes or depicts the tag, etc.). For example, the Vessel Level parameter is assigned a tag of L XX27. In such examples, the VA 100 can return the tag 308 associated with at least the Vessel Level parameter in response to the user 104, the host application 106, the wearable devices 128, 130, 132, etc., requesting information associated with the process tank 122.

In the illustrated example of FIG. 3, the profile 300 includes the description 310 to represent additional information that can be provisioned in response to a request. For example, information included in the description 310 can be packaged in a response to the user 104 in response to the user 104 asking for additional information associated with at least the parameter 306. For example, the user 104 can ask the VA 100, "What is the level of the process tank?" In response to the request, the VA 100 can verbally respond with "The Vessel Level with a tag of L XX27 is 80% full." The user 104 can issue a follow-up request of "Provide me more information on the level," to which the VA 100 can respond with "The Vessel Level is the most important parameter for knockout pots." Additionally or alternatively, the information included in the description 310 and/or, more generally, the profile 300 of FIG. 3 can be displayed on the host application 106. In other examples, the user 104 can issue a request of "Tell me about the surge drum." In response to the request, the VA 100 can verbally respond with a value of the flow/in/flow out parameter and/or the corresponding tag. The VA 100 may not return the temperature parameter and/or the temperature tag based on the corresponding description of "IF REQUESTED." For example, the VA 100 may not return information associated with the temperature of the surge drum unless requested by the user 104.

Figure 4:
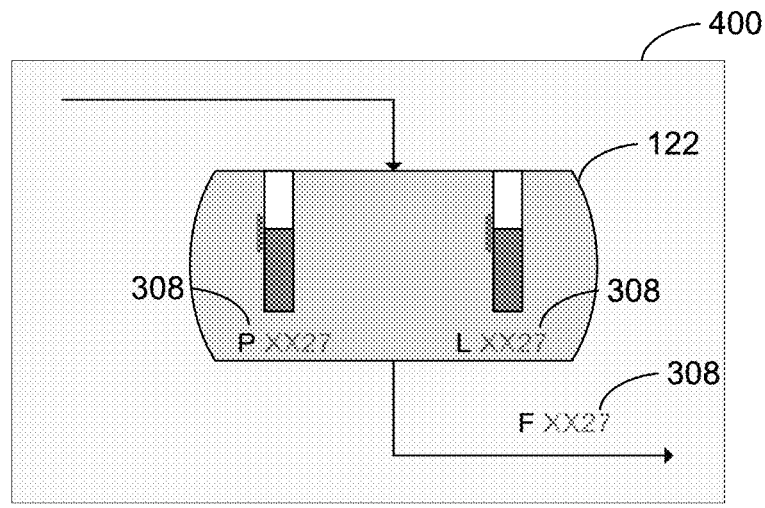
FIG. 4 is a schematic illustration of a first example visualization corresponding to the example profile of FIG. 3.

FIG. 4 is a schematic illustration of a first example visualization 400 corresponding to the example profile 300 of FIG. 3. The first visualization 400 of FIG. 4 corresponds to a first level visualization associated with L1 of the profile 300 of FIG. 3. Alternatively, the first visualization 400 may correspond to a different level. The first visualization 400 can be displayed via the host application 106 of FIGS. 1A-2 in response to the request 201a-b of FIG. 2 from the user 104, the host application 106, the wearable devices 128, 130, 132, etc. The first visualization 400 includes a schematic illustration of the process tank 122 of FIGS. 1A-1B. The first visualization 400 includes the tags 308 associated with L1 of the profile 300 of FIG. 3. For example, the first visualization 400 includes the tags 308 associated with the Vessel Level parameter (L XX27), the Vessel Pressure parameter (P XX27), and the Flow In/Flow Out parameter (F XX27). In some examples, the first visualization 400 can be updated by the VA 100 based on a request for additional information. For example, the tag 308 associated with the Temperature parameter (T XX27) can be displayed on the first visualization 400 in response to the request for additional information for the process tank 122.

Figure 5:
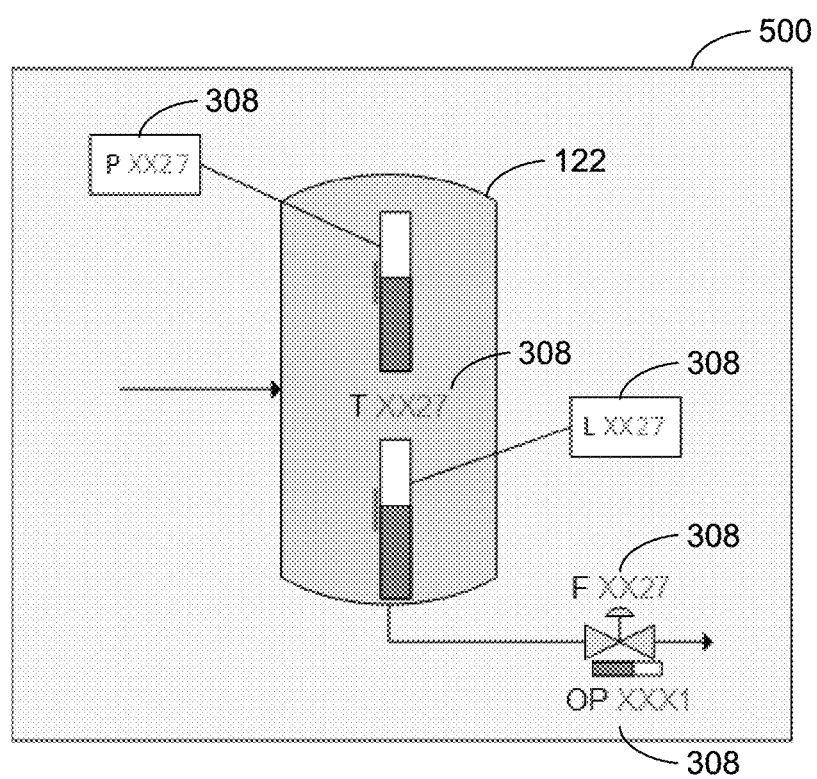
FIG. 5 is a schematic illustration of a second example visualization corresponding to the example profile of FIG. 3.

FIG. 5 is a schematic illustration of a second example visualization 500 corresponding to the example profile 300 of FIG. 3. The second visualization 500 of FIG. 5 corresponds to a second level visualization associated with L2 of the profile 300 of FIG. 3. In FIG. 5, the second visualization 500 includes information associated with the first and second levels of the profile 300. Alternatively, the second visualization 500 may depict information associated only with the second level of the profile 300.

The second visualization 500 can be displayed via the host application 106 of FIGS. 1A-2 in response to a request from the user 104, the host application 106, etc. The second visualization 500 includes an illustration of the process tank 122 of FIGS. 1A-1B. The second visualization 500 includes the tags 308 associated with the first level and the second level of the profile 300 of FIG. 3. For example, the second visualization 500 includes the tags 308 associated with the Vessel Level parameter (L XX27), the Vessel Pressure parameter (P XX27), the Flow In/Flow Out parameter (F XX27), the Temperature parameter (T XX27), and the Vessel Temperature parameter (T XX27). For example, the user 104 can request the VA 100 for information associated with the process tank 122. The VA 100 can generate a first response including the tags 308 depicted in the first visualization 400 of FIG. 4. For example, the host application 106 can display the first visualization 400 including the tags 308 depicted in FIG. 4 based on the first response. The user 104 can request the VA 100 for additional information corresponding to the process tank 122. In response to the request, the VA 100 can generate a second response including the tags 308 depicted in the second visualization 500 of FIG. 5. For example, the host application 106 can display the second visualization 500 including the tags 308 depicted in FIG. 5 based on the second response. For example, the host application 106 can replace the first visualization 400 with the second visualization 500. Alternatively, the host application 106 can add the additional tags 308 in FIG. 5 to the first visualization 400.

Figure 6:
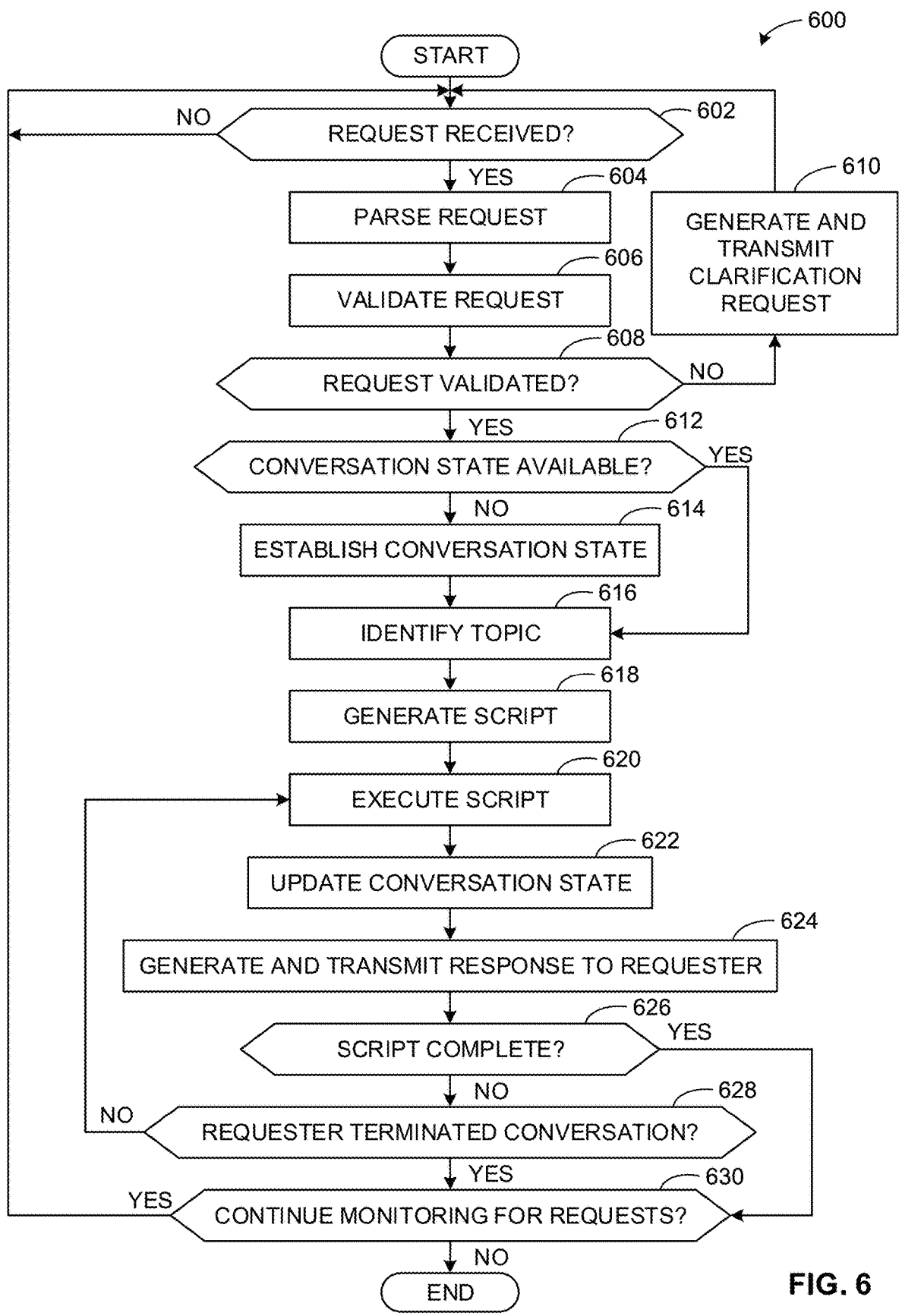
FIG. 6 is a flowchart representative of machine readable instructions that may be executed to implement the example virtual assistant of FIGS. 1A-2 to generate and execute a script based on a request.
Figure 7:
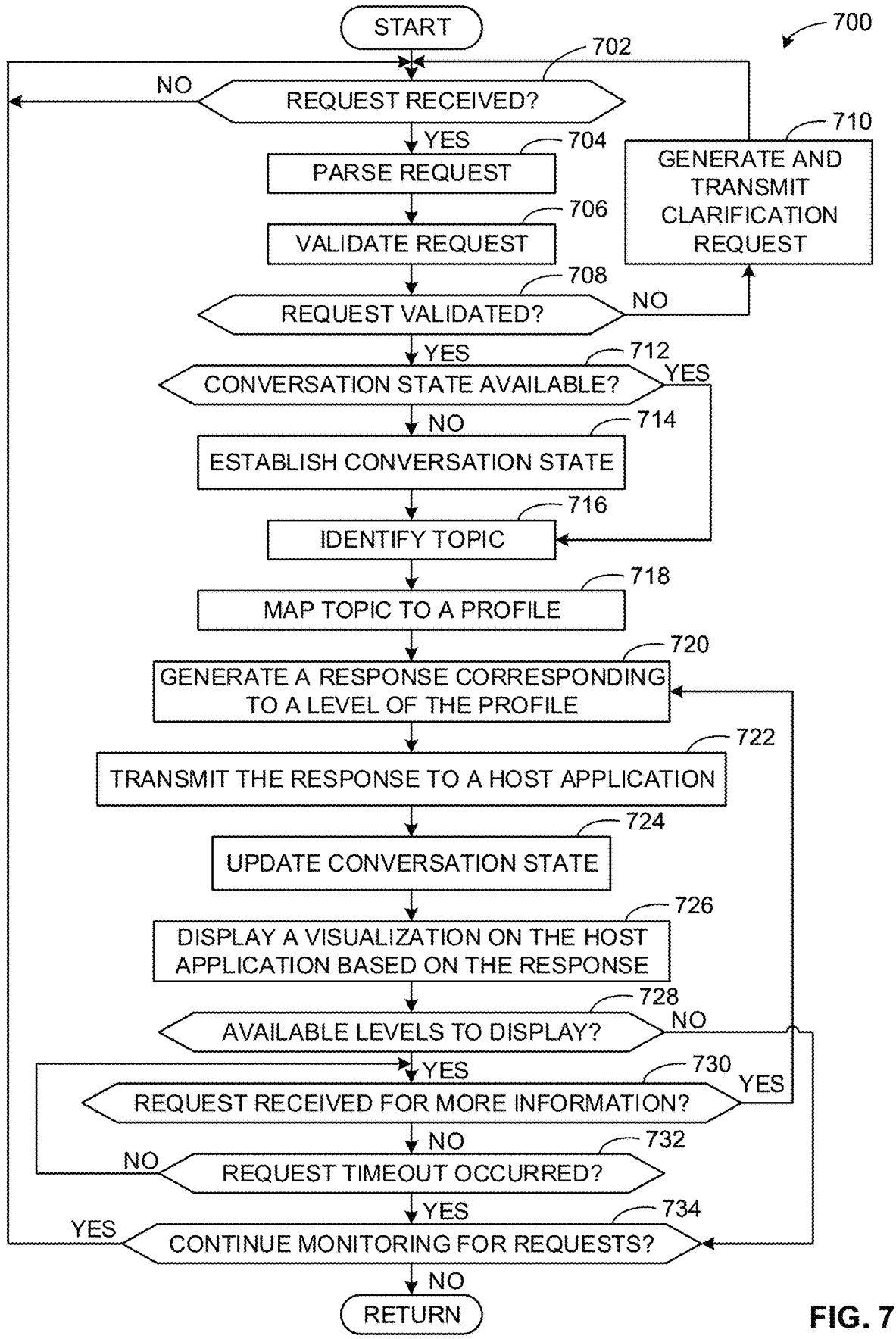
FIG. 7 is a flowchart representative of machine readable instructions that may be executed to implement the example virtual assistant of FIGS. 1A-2 to generate and display a visualization based on a request.

Flowcharts representative of example hardware logic, machine readable instructions, hardware implemented state machines, and/or any combination thereof for implementing the VA 100 of FIGS. 1A-2 are shown in FIGS. 6-7. The machine-readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIG. 6-7, many other methods of implementing the example VA 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 that may be executed to implement the VA 100 of FIGS. 1A-2 to generate and execute a script based on a request. The machine readable instructions 600 begin at block 602, at which the VA 100 determines whether a request has been received. For example, the framework controller 212 of FIG. 2 can determine that the user 104 issued the first request 201a of FIG. 2 to the VA 100 via one of the wearable devices 128, 130, 132, the DCS controller assembly 226, etc., to open the first field device 116 of FIG. 1A. In other examples, the framework controller 212 can determine that the host application 106 generated the second request 201b to the VA 100 to open the first field device 116.

If, at block 602, the VA 100 determines that a request has not been received, the VA 100 continues to wait for a request. If, at block 602, the VA 100 determines that a request has been received, then, at block 604, the VA 100 parses the request. For example, the parser 214 of FIG. 2 can parse the request 201a-b into one or more tokens. In response to parsing the request at block 604, the VA 100 validates the request at block 606. For example, the analyzer 216 of FIG. 2 can compare the one or more tokens to valid tokens.

At block 608, the VA 100 determines whether the request is validated. For example, the analyzer 216 can determine that the request 201a-b is not valid by determining that one or more tokens are not valid, an order of the tokens is not a valid order, etc., based on the comparison of the analyzed tokens to valid tokens. In other examples, the analyzer 216 can determine that the request 201a-b is valid based on one or more of the analyzed tokens being identified as valid tokens. In other words, the analyzer 216 can determine that the request 201a-b is valid based on the identification of the validated token(s).

If, at block 608, the VA 100 determines that the request is not validated, control proceeds to block 610 to generate and transmit a clarification request. For example, the generator 218 of FIG. 2 can generate a clarification request and transmit the clarification request to the user 104, the host application 106, one of the wearable devices 128, 130, 132, etc. In such examples, the clarification request can include a prompt to repeat the request, re-phrase the request, provide another request, etc. In response to generating and transmitting the clarification request, control returns to determine whether another request is received at block 602.

If, at block 608, the VA 100 determines that the request is validated, then, at block 612, the VA 100 determines whether a conversation state is available. For example, the conversation processor 238 can query the conversation state handler 242 of FIG. 2 to determine if a conversation has been instantiated and/or otherwise initialized. In such examples, the conversation processor 238 can determine that the conversation state is not available based on a conversation not being instantiated and a corresponding conversation state not being stored and/or otherwise managed by the conversation state handler 242. In other examples, the conversation processor 238 can determine that the conversation state is available based on a conversation being instantiated and a corresponding conversation state is stored and/or otherwise is being managed by the conversation state handler 242. For example, the conversation state handler 242 can transmit a conversation state such as a topic, a completion status of a script, an action being executed by the action processor 240, etc., to the conversation processor 238.

If, at block 612, the VA 100 determines that the conversation state is available, control proceeds to block 616 to identify a topic. If, at block 612, the VA 100 determines that the conversation state is not available, then, at block 614, the VA 100 establishes a conversation state. For example, the conversation processor 238 can initialize a conversation and transmit a corresponding conversation state to the conversation state handler 242. In response to establishing the conversation state, the VA 100 identifies a topic at block 616. For example, the conversation processor 238 can identify a topic of the first field device 116 based on the processed request obtained from the server bot framework 210 of FIG. 2.

At block 618, the VA 100 generates a script. For example, the conversation processor 238 can map the topic 246 of FIG. 2 to one or more of the configurations 248a, one or more of the scripts 248b, one or more of the actions 250, etc., and/or a combination thereof in the conversation context database 244 of FIG. 2. In such examples, the conversation processor 238 can package a script based on the mapping. For example, the conversation processor 238 can generate a script including the one or more configurations 248a, the one or more scripts 248b, the one or more actions 250, etc., and/or a combination thereof that the topic 246 maps to in the conversation context database 244.

In response to generating the script, the VA 100 executes the script at block 620. For example, the action processor 240 of FIG. 2 can transmit a command to one of the systems 222 of FIG. 2 to facilitate an execution of the script generated by the conversation processor 238. For example, the action processor 240 can generate a command to the process control system 102 of FIGS. 1A-1B to open the first field device 116.

At block 622, the VA 100 updates a conversation state. For example, the conversation state handler 242 can update the conversation state to complete in response to opening the first field device 116. In other examples, the conversation state handler 242 can update the conversation state from opening the first field device 116 to the first field device 116 being opened, the first field device being 95% opened, etc.

In response to updating the conversation state, the VA 100 generates and transmits a response to the requester at block 624. For example, the conversation processor 238 can package and transmit a response to the user 104, the host application 106, one of the wearable devices 128, 130, 132, the DCS controller assembly 226 of FIG. 2, etc., indicating that the first field device 116 is opened and/or a valve position of the first field device 116.

At block 626, the VA 100 determines whether a script is complete. For example, the conversation state handler 242 can determine that a script associated with the request from the user 104, the host application 106, etc., is complete based on the action processor 240 completing all actions included in the script. In other examples, the conversation state handler 242 can determine that the script is not complete based on one or more actions to be completed by the action processor 240 and/or the user 104, the host application 106, etc., not issuing an acknowledgment that the script is complete.

If, at block 626., the VA 100 determines that the script is complete, control proceeds to block 630 to determine whether to continue monitoring for requests. If, at block 626, the VA 100 determines that the script is not complete, then, at block 628, the VA 100 determines whether the requester terminated the conversation. For example, the conversation processor 238 can determine if the user 104, the host application 106, etc., generated a command to the VA 100 to terminate the conversation.

At block 630, the VA 100 determines whether to continue monitoring for requests. If, at block 630, the VA 100 determines to continue monitoring for requests, control returns to wait for another request and determine whether another request is received at block 602. If, at block 630, the VA 100 determines not to continue monitoring for requests, the machine readable instructions 600 of FIG. 6 conclude.

FIG. 7 is a flowchart representative of example machine readable instructions 700 that may be executed to implement the VA 100 of FIGS. 1A-2 to generate and display a visualization based on a request. The machine readable instructions 700 begin at block 702, at which the VA 100 determines whether a request has been received. For example, the framework controller 212 of FIG. 2 can determine that the user 104 issued a verbal request of "Show me the process tank" to the VA 100 via the host application 106. In other examples, the framework controller 212 can determine that the host application 106 generated a request to the VA 100 to retrieve information about the process tank 122 of FIGS. 1A-1B.

If, at block 702, the VA 100 determines that a request has not been received, the VA 100 continues to wait for a request. If, at block 702, the VA 100 determines that a request has been received, then, at block 704, the VA 100 parses the request. For example, the parser 214 of FIG. 2 can parse the request 201a-b of FIG. 2 into one or more tokens. In response to parsing the request at block 704, the VA 100 validates the request at block 706. For example, the analyzer 216 of FIG. 2 can compare the one or more tokens to valid tokens.

At block 708, the VA 100 determines whether the request is validated. For example, the analyzer 216 can determine that the request is not valid by determining that one or more tokens are not valid, an order of the tokens is not a valid order, etc., based on the comparison of the analyzed tokens to valid tokens. In other examples, the analyzer 216 can determine that the request 201a-b is valid based on one or more of the analyzed tokens being identified as valid tokens.

If, at block 708, the VA 100 determines that the request is not validated, control proceeds to block 710 to generate and transmit a clarification request. For example, the generator 218 of FIG. 2 can generate a clarification request and transmit the clarification request to the user 104, the host application 106, etc. In such examples, the clarification request can include a prompt to repeat the request 201a-b, re-phrase the request 201a-b, provide another one of the requests 201a-b, etc. In response to generating and transmitting the clarification request, control returns to determine whether another request is received at block 702.

If, at block 708, the VA 100 determines that the request is validated, then, at block 712, the VA 100 determines whether a conversation state is available. For example, the conversation processor 238 can query the conversation state handler 242 of FIG. 2 to determine if a conversation has been instantiated and/or otherwise initialized. In such examples, the conversation processor 238 can determine that the conversation state is not available based on a conversation not being instantiated and a corresponding conversation state not being stored and/or otherwise managed by the conversation state handler 242. In other examples, the conversation processor 238 can determine that the conversation state is available based on a conversation being instantiated and a corresponding conversation state is stored and/or otherwise is being managed by the conversation state handler 242. For example, the conversation state handler 242 can transmit a conversation state such as a topic, a completion status of a script, an action being executed by the action processor 240, etc., to the conversation processor 238.

If, at block 712, the VA 100 determines that the conversation state is available, control proceeds to block 716 to identify a topic. If, at block 712, the VA 100 determines that the conversation state is not available, then, at block 714, the VA 100 establishes a conversation state. For example, the conversation processor 238 can initialize a conversation and transmit a corresponding conversation state to the conversation state handler 242. In response to establishing the conversation state, the VA 100 identifies a topic at block 716. For example, the conversation processor 238 can identify a topic of the process tank 122 based on the processed request obtained from the server bot framework 210 of FIG. 2.

In response to identifying the topic, the VA 100 maps the topic to a profile at block 718. For example, the conversation processor 238 can map the topic of the process tank 122 to the profile 300 of FIG. 3 in the conversation context database 244 of FIG. 2. In such examples, the conversation processor 238 can determine that the identified topic included in the request from the user 104, the host application 106, etc., corresponds to the process tank 122 based on the mapping. The conversation processor 238 can determine information associated with the process tank 122 based on the mapping including which field devices of the process control system 102 of FIGS. 1A-1B are coupled to the process tank 122, which field devices of the process control system 102 are monitoring or performing measurements associated with the process tank 122, etc. Additionally or alternatively, the conversation processor 238 can determine information included in the profile 300 including the parameters 306, the tags 308, the descriptions 310, etc.

At block 720, the VA 100 generates a response corresponding to a level of the profile. For example, the conversation processor 238 can package a response including information associated with L1 of the profile 300. In such examples, the response can include information corresponding to at least one of the Common category or the Surge Drum category of FIG. 3. For example, the response can include at least one of the Vessel Level parameter, the Vessel Pressure parameter, the corresponding tags 308, the corresponding descriptions 310, etc.

At block 722, the VA 100 transmits the response to a host application. For example, the conversation processor 238 can transmit the response to the host application 106 via at least one of the host application bot framework 208 or the server bot framework 210. In such examples, host application 106 can generate the first visualization 400 of FIG. 4 and display the first visualization 400 on a graphical user interface (GUI), a human machine interface (HMI), etc., via the third wearable device 132 of FIG. 1B, the mobile application 202, the browser application 204, the desktop application 206, etc. For example, the host application 106 can display the first visualization 400 on a display of a lens, a mobile device, a desktop computer, a laptop computer, or any other display communicatively coupled to a computing device. In other examples, the conversation processor 238 can transmit the response to the host application 106 operating and/or otherwise executing on an HMI communicatively coupled to the DCS controller assembly 226 of FIG. 2.

At block 724, the VA 100 updates a conversation state. For example, the conversation processor 238 can instruct the conversation state handler 242 to update a conversation state based on the response. For example, the conversation state handler 242 can assign L1 to the conversation state indicating that information associated with L1 has been communicated to a requester such as the user 104, the host application 106, etc. In other examples, the conversation state handler 242 can assign the topic of the process tank 122 and/or L1 and/or information transmitted to the user 104, the host application 106, etc., to the conversation state.

At block 726, the VA 100 displays a visualization on the host application based on the response. For example, the server bot framework 210 can transmit the response to the host application 106 directing the host application 106 to display the first visualization 400 on a GUI, HMI, etc., on a device executing the host application 106.

In response to displaying the visualization, the VA 100 determines whether there are available levels to display at block 728. For example, the conversation processor 238 can determine that L2 has not been communicated to the host application 106. In other examples, the conversation processor 238 can determine that a parameter associated with L1 such as the Vessel Pressure parameter has not been communicated because the user 104, the host application 106, etc., only requested the Vessel Level parameter. In yet other examples, the conversation processor 238 can determine that one of the categories 304 has not been communicated based on the request for a different one of the categories 304. In such examples, the conversation processor 238 can determine to provide information that has not yet been requested, provided, etc., to the user 104, the host application 106, etc., in response to a request for additional information associated with the process tank 122.

If, at block 728, the VA 100 determines that there are no available levels to display, control proceeds to block 734 to determine whether to continue monitoring for requests. If, at block 728, the VA 100 determines that there are available levels to display, then, at block 730, the VA 100 determines whether a request has been received for more information on the topic. For example, the framework controller 212 can determine if a request has been received from the user 104, the host application 106, etc. In response to determining that the request has been received, the conversation processor 238 can determine if the request is associated with the topic of the process tank 122. If the conversation processor 238 determines that the request corresponds to a query for more information on the process tank 122, the conversation processor 238 can obtain the conversation state from the conversation state handler 242 and determine information included in the profile 300 to package in a response to the request. For example, the conversation processor 238 can obtain the conversation state of L1 from the conversation state handler 242, and determine to package information associated with L2 in a response and transmit the response to the user 104, the host application 106, etc.

If, at block 730, the VA 100 determines that the request received is for more information on the topic, control returns to block 720 to generate a response corresponding to a level of the profile. For example, the conversation processor 238 can package information associated with L2 of the profile 300 in a response such as the Vessel Temperature parameter, the tag T XX27, etc., and/or a combination thereof. In other examples, the conversation processor 238 can package information associated with the Surge Drum category, another parameter, tag, or description associated with the Common category, etc., depicted in FIG. 3. In response to generating the response, the VA 100 can proceed with transmitting the response to the host application at block 722, updating the conversation state at block 724 (e.g., updating the conversation state to L2, information associated with L1 and/or L2, etc.) and directing at least one of the third wearable device 132 displaying a visualization or the host application 106 to display the visualization on the host application 106 based on the response. For example, the VA 100 can direct the host application 106 to display the second visualization 500 of FIG. 5 on a mobile device, desktop computer, etc., executing the host application 106.

If, at block 730, the VA 100 determines that the request received is not for more information on the topic, then, at block 732, the VA 100 determines whether a request timeout has occurred. For example, the framework controller 212 can determine that a request from the user 104, the host application 106, etc., has not been received within a threshold time period (e.g., 1 minute, 10 minutes, 60 minutes, etc.). In other examples, the conversation processor 238 can determine that a request has been received but is not directed to the topic of the process tank 122. In such examples, the conversation processor 238 can instruct the conversation state handler 242 to update the conversation state, replace the conversation state with a new topic, or disassociate the topic of the process tank 122 from the conversation state. In other examples, the conversation processor 238 can instruct the conversation state handler 242 to instantiate another conversation state to exist concurrently with the conversation state associated with the process tank 122.

If, at block 732, the request timeout has not occurred, control returns to block 730 to wait for another request. If, at block 732, the request timeout has occurred, then, at block 734, the VA 100 determines whether to continue monitoring for requests. For example, the framework controller 212 can determine to shut down the VA 100, transition the VA 100 to operate in a low power or hibernation mode, etc.

If, at block 734, the VA 100 determines to continue monitoring for requests, control returns to block 702 to wait for another request. If, at block 734, the VA 100 determines not to continue monitoring for requests, the machine readable instructions 700 of FIG. 7 conclude.

Figure 8:
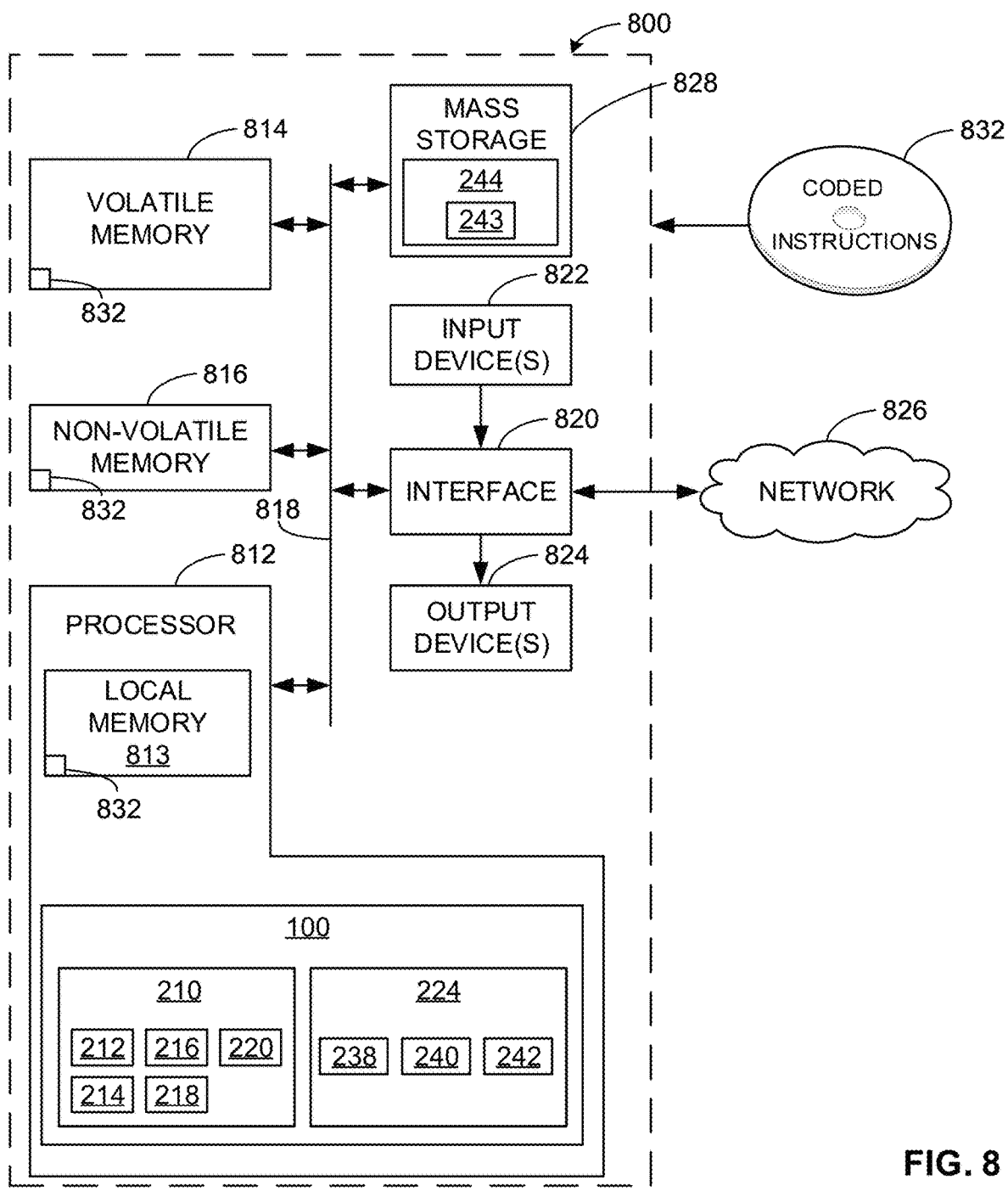
FIG. 8 is a block diagram of an example processing platform structured to execute the instructions of FIGS. 6-7 to implement the example virtual assistant of FIGS. 1A-2.

FIG. 8 is a block diagram of an example processor platform 800 structured to execute the instructions of FIGS. 6-7 to implement the VA 100 of FIGS. 1A-2. The processor platform 800 can be, for example, a server, a personal computer, a workstation, a DCS controller assembly (e.g., the DCS controller assembly 226 of FIG. 2) a self-learning machine (e.g., a neural network), a mobile device (e.g., a cell phone, a smart phone, a tablet such as an iPad™), a personal digital assistant (PDA), an Internet appliance, a headset or other wearable device (e.g., the wearable devices 128, 130, 132 of FIG. 1), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the server bot framework 210, the framework controller 212, the parser 214, the analyzer 216, the generator 218, the executer 220, the conversation context engine 224, the conversation processor 238, the action processor 240, the conversation state handler 242, and/or, more generally, the VA 100.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage devices 828 implement the conversation context database 244 of FIG. 2 that includes the model(s) 243 of FIG. 2.

The machine executable instructions 832 of FIGS. 6-7 may be stored in the mass storage device 828, in the volatile memory 814, in the non-volatile memory 816, and/or on a removable non-transitory computer readable storage medium such as a CD or DVD.

From the foregoing, it will be appreciated that example systems, methods, apparatus, and articles of manufacture have been disclosed that augment process control using a process control virtual assistant. The process control virtual assistant disclosed herein corresponds to a system that enables applications such as process control mobile applications, browser applications, and/or desktop applications, for example, to initiate conversations with bots or bot frameworks that assist users in process control environments in tasks associated with process control. Disclosed process control virtual assistants can return parameters, historical data, alarms, or other information specific to process control components including equipment, field devices, control strategy, or batch. In some disclosed examples, basic scripts can return information including parameters while complex scripts could, in addition, create a workflow, which, in turn, could execute additional automated scripts guiding the user through a more intricate sequence of process control tasks or instructions.

Examples disclosed herein provide a process centric virtual assistant framework that can be used to support roles specific to process operations including engineer, environmental specialist, operator, maintenance, supervisor, etc. Examples disclosed herein identify process control components, actions, tasks, etc., in response to a request from a user and/or a host application executing on a computing device. Examples disclosed herein enables sets of actions to be triggered on process components, enables profiles of information to be returned on process components, and/or enables users to view visualizations of returned information. Examples disclosed herein support multiple users and/or multiple platforms. Examples disclosed herein include DCS controller assemblies that implement the disclosed process control virtual assistant that can be disposed in one or more locations of a process control environment that can connect through the process control network to facilitate and/or otherwise augment process control.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to augment process control using a virtual assistant, the apparatus co prising:
    memory including machine-readable instructions; and
    at least one processor to execute the machine-readable instructions to at least:
        determine a context of a request for information associated with a field device of a process control system, the process control system having a configuration identifying one or more field devices including the fieid device;
        identify a topic associated with the request, the topic corresponding to the field device based on the context;
        identify an action associated with a function to be executed by the field device;
        identify a parameter associated with a process control value associated with the field device:
        map the topic to at least one of the action or the parameter
        generate a profile based on at least one of the action or the parameter;
        generate a command based on the profile; and
        transmit the command to the field device to cause the field device to execute the action.

2. The apparatus of claim 1, wherein the request is a verbal request communicated to an input/output module of a programmable logic controller, at least one of the input/output module or the programmable logic controller including at least one of a microphone or a speaker.

3. The apparatus of claim 1, wherein the request is a verbal request communicated to a wearable device including at least one of a display, a microphone, or a speaker.

4. The apparatus of claim 1, wherein the at least one processor is to:
    establish a conversation state based on the topic;
    generate a response including the conversation state;
    transmit the response to a computing device; and
    display a visualization on a display associated with the computing device based on the response.

5. The apparatus of claim 1, wherein the profile includes at least a first level and a second level, and wherein the at least one processor is to:
    map the topic to the first level;
    generate a response including data associated with the first level;
    transmit the response to a computing device; and
    display a visualization on a display associated with the computing device based on the data.

6. The apparatus of claim 5, wherein the request is a first request, the data is first data, the visualization is a first visualization, and wherein the at least one processor is to:
    receive a second request associated with the topic;
    map the second request to the second level;
    generate a second response including second data associated with the second level;
    transmit the second response to the computing device; and
    replace the first visualization with a second visualization on the display based on the second data.

7. A method to augment process control using a virtual assistant, the method comprising:
    determining a context associated with a request for information associated with a field device of a process control system, the process control system having a configuration identifying one or more field devices including the field device;
identifying a topic indicated by the request, the topic corresponding to the field device based on the context;
identifying an action associated with a function to be executed by the field device;
identifying a parameter associated with a process control value associated with the field device;
mapping the topic to at least one of the action or the parameter;
generating a profile based on at least one of the action or the parameter;
generating a command based on the profile; and
transmitting the command to the field device to cause the field device to execute the action.

8. The method of claim 7, wherein the request is a verbal request communicated to a programmable logic controller.

9. The method of claim 7, wherein the request is a verbal request communicated to a wearable device, the wearable device corresponding to glasses, a headset, or a wrist band.

10. The method of claim 7, further including:
establishing a conversation state based on the topic;
generating a response including the conversation state;
transmitting the response to a computing device; and
displaying a visualization on a display associated with the computing device based on the response.

11. The method of claim 7, wherein the profile includes at least a first level and a second level, and further including:
mapping the topic to the first level;
generating a response including data associated with the first level;
transmitting the response to a computing device; and
generating a visualization on a display associated with the computing device based on the data.

12. The method of claim 11, wherein the request is a first request, the data is first data, the visualization is a first visualization, and further including:
receiving a second request associated with the topic;
mapping the second request to the second level;
generating a second response including second data associated with the second level;
transmitting the second response to the computing device; and
replacing the first visualization with a second visualization on the display based on the second data.

13. The method of claim 7, wherein determining the context includes:
parsing the request into one or more tokens including a first token;
validating the request by identifying the first token as a validated token; and
in response to validating the request based on the identification of the first token as the validated token, generating a script including the action.

14. The method of claim 13, wherein the request is a first request, and further including:
in response to not validating the first request, generating a response corresponding to a clarification request;
transmitting the response to a computing device associated with a user;
receiving a second request from the computing device, the second request from the user;
validating the second request; and
generating the script based on the second request.

15. A non-transitory computer readable storage medium comprising instructions which, when executed, cause a machine to at least:
determine a context of a request for information associated with a field device of a process control system, the process control system having a configuration including one or more field devices including the field device;
identity a topic associated with the request, the topic corresponding to the field device based on the context;
identify an action associated with a function to be executed by the field device;
identify a parameter associated with a process control value associated with the field device;
map the topic to at least one of the action or the parameter;
generate a profile based on at least one of the action or the parameter;
generate a command based on the profile; and
transmit the command to the field device to cause the field device to execute the action.

16. The non-transitory computer readable storage medium of claim 15, wherein the request is a verbal request communicated to a programmable logic controller.

17. The non-transitory computer readable storage medium of claim 15, wherein the request is a verbal request communicated to a wearable device.

18. The non-transitory computer readable storage medium of claim 15, wherein the instructions, when executed, cause the machine to at least:
establish a conversation state based on the topic;
generate a response including the conversation state;
transmit the response to a computing device; and
display a visualization on a display associated with the computing device based on the response.

19. The non-transitory computer readable storage medium of claim 15, wherein the profile includes at least a first level and a second level, and the instructions, when executed, cause the machine to at least:
map the topic to the first level;
generate a response including data associated with the first level;
transmit the response to a computing device; and
display a visualization on a display associated with the computing device based on the data.

20. The non-transitory computer readable storage medium of claim 19, wherein the request is a first request, the data is first data, the visualization is a first visualization, and the instructions, when executed, cause the machine to at least:
receive a second request associated with the topic;
map the second request to the second level;
generate a second response including second data associated with the second level;
transmit the second response to the computing device; and
replace the first visualization with a second visualization on the display based on the second data.

21. The non-transitory computer readable storage medium of claim 15, wherein the instructions, when executed, cause the machine to at least:
parse the request into one or more tokens including a first token;
validate the request by mapping the first token to a validated token; and
generate a script including the action in response to validating the request based on the mapping.

22. The non-transitory computer readable storage medium of claim 21, wherein the request is a first request, and the instructions, when executed, cause the machine to at least:

generate a response corresponding to a clarification request when the first request is not validated based on the mapping;
transmit the response to a computing device associated with a user;
receive a second request from the computing device, the second request from the user;
validate the second request; and
generate the script based on the second request.

23. The apparatus of claim 1, wherein the at least one processor is to:
parse the request into one or more tokens including a first token;
validate the request by identifying the first token as a validated token; and
in response to validating the request based on the identification of the first token as the validated token, generate a script including the action.

24. The apparatus of claim 23, wherein the script includes at least one of a workflow instruction to complete a workflow, one or more tools to perform the workflow instruction, or one or more validation steps to validate that the workflow has been completed correctly, and the at least one processor is to cause a speaker to audibly communicate at least one of the workflow instruction, the one or more tools, or the one or more validation steps to a user.

25. The apparatus of claim 23, wherein the request is a first request, and the at least one processor is to:
in response to not validating the first request, generate a response corresponding to a clarification request;
transmit the response to a computing device associated with a user;
receive a second request from the computing device, the second request from the user;
validate the second request; and
generate the script based on the second request.

* * * * *